US007917960B2

(12) United States Patent
Kori et al.

(10) Patent No.: US 7,917,960 B2
(45) Date of Patent: *Mar. 29, 2011

(54) TRANSMITTER, SIGNAL TRANSFER METHOD, DATA DISTRIBUTION SYSTEM AND METHOD OF SAME, DATA RECEIVER, DATA PROVIDER AND METHOD OF SAME, AND DATA TRANSFERER

(75) Inventors: Teruhiko Kori, Kanagawa (JP); Asako Fujii, New York, NY (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,146

(22) Filed: Sep. 15, 2009

(65) Prior Publication Data

US 2010/0011445 A1 Jan. 14, 2010

Related U.S. Application Data

(60) Continuation of application No. 11/319,857, filed on Dec. 28, 2005, which is a division of application No. 09/980,057, filed on Mar. 13, 2002, now Pat. No. 7,418,735.

(30) Foreign Application Priority Data

Apr. 4, 2000 (JP) ................................. 2000-102246
May 17, 2000 (JP) ................................. 2000-149846

(51) Int. Cl.
*G06F 7/04* (2006.01)

(52) U.S. Cl. ......................................................... 726/27

(58) Field of Classification Search ...................... 726/27
See application file for complete search history.

(56) References Cited

U.S. PATENT DOCUMENTS

| 5,659,613 | A | 8/1997 | Copeland et al. |
| 6,314,518 | B1 | 11/2001 | Linnartz |
| 6,678,464 | B1 | 1/2004 | Kawai et al. |

FOREIGN PATENT DOCUMENTS

| EP | 0 901 124 | 3/1999 |
| EP | 0 932 298 | 7/1999 |
| JP | 8 32952 | 2/1996 |
| JP | 8 65652 | 3/1996 |
| JP | 9-284748 | 10/1997 |
| JP | 10 174057 | 6/1998 |
| JP | 10 224752 | 8/1998 |
| JP | 10-290443 | 10/1998 |
| JP | 11-136618 | 5/1999 |
| JP | 11 136618 | 5/1999 |
| JP | 11 145840 | 5/1999 |
| JP | 11-149709 | 6/1999 |
| JP | 11 196114 | 7/1999 |
| JP | 11 196115 | 7/1999 |
| JP | 11 212462 | 8/1999 |
| JP | 11-243534 | 9/1999 |
| JP | 2000 23088 | 1/2000 |
| JP | 2000 23089 | 1/2000 |
| JP | 2000 57686 | 2/2000 |
| JP | 2000 59753 | 2/2000 |
| JP | 2000-76790 | 3/2000 |
| WO | WO 97 43761 | 11/1997 |
| WO | WO 97 43853 | 11/1997 |
| WO | WO 98 02881 | 1/1998 |
| WO | WO 99 53689 | 10/1999 |
| WO | WO 00 04713 | 1/2000 |

OTHER PUBLICATIONS

"Content Protection System Architecture: A Comprehensive Framework for Content Protection, Revision 0.81" CPSA—A Comprehensive Framework for Content Protection, Feb. 17, 2000, XP002226101.
Hartrung and Girod: "Digital Watermarking of Raw and Compressed Video" Proceedings of the SPIE, SPIE, Bellingham VA, US, vol. 2952, Oct. 7, 1996, pp. 205-213, XP002085796 ISSN: 0277-786X.
Patent Abstracts of Japan vol. 1999, No. 11, Sep. 30, 1999 & JP 11 149709 A (Jisedai Joho Hoso System Kenkyusho:KK), Jun. 2, 2999 (1999-06-02).
Patent Abstracts of Japan, vol. 1999, No. 12, Oct. 29, 1999 & JP 11 196114 A (Canon Inc.), Jul. 21, 1999.
Patent Abstracts of Japan, vol. 1997, No. 11, Nov. 28, 1997 & JP 9 186965 A (Sony Corp.), Jul. 15, 1997.
Zhao J: "a www service to embed and prove digital copyright watermarks" 19960528; No. 2, May 28, 1996, pp. 695-709, XP000199921.

*Primary Examiner* — Jacob Lipman
(74) *Attorney, Agent, or Firm* — Frommer Lawrence & Haug LLP; William S. Frommer

(57) ABSTRACT

To enable usage of content at a receiver which does not have a copying function even if copyright protection is provided. Model names of receivers not having a function enabling copying of content are held in an authentication processing circuit (151) of a transmitter (10). When a model name obtained from a connected receiver (40) is held, regardless of whether the content is copyright protected, a signal selection circuit (122) selects a terminal a side, a switch (123) is turned on, and an unencrypted signal is transmitted. When a change of the receiver (40) is detected by a hot plug detection function or a plug and play function at a processing circuit (152) during the transfer of a signal of copyright protected content without providing copyright protection, the selection circuit (122) is made to select a terminal b side or the switch (123) is turned off to suspend the transfer of the non-copyright protected signal. The information indicating the receiver is held in a tamper-proof updateable manner.

12 Claims, 15 Drawing Sheets

FIG.2

| PIN | SIGNAL NAME | PIN | SIGNAL NAME | PIN | SIGNAL NAME |
|---|---|---|---|---|---|
| 1 | TMDS Data2− | 9 | TMDS Data1− | 17 | TMDS Data0− |
| 2 | TMDS Data2+ | 10 | TMDS Data1+ | 18 | TMDS Data0+ |
| 3 | TMDS Data2/4 Shield | 11 | TMDS Data1/3 Shield | 19 | TMDS Data0/5 Shield |
| 4 | TMDS Data4− | 12 | TMDS Data3− | 20 | TMDS Data5− |
| 5 | TMDS Data4+ | 13 | TMDS Data3+ | 21 | TMDS Data5+ |
| 6 | DDC Clock | 14 | +5V Power | 22 | TMDS Clock Shield |
| 7 | DDC Data | 15 | Ground | 23 | TMDS Clock + |
| 8 | Analog v. Sync | 16 | Hot Plug Detect | 24 | TMDS Clock − |
| C1 | Analog Red | C2 | Analog Green | C3 | Analog Blue |
| C2 | Analog H. Sync | C5 | Analog Ground | | |

US 7,917,960 B2

TRANSMITTER, SIGNAL TRANSFER METHOD, DATA DISTRIBUTION SYSTEM AND METHOD OF SAME, DATA RECEIVER, DATA PROVIDER AND METHOD OF SAME, AND DATA TRANSFERER

This is a continuation of U.S. application Ser. No. 11/319,857, filed Dec. 28, 2005, which is a divisional of U.S. application Ser. No. 09/980,057, filed Mar. 13, 2002 under 35 USC 371, now U.S. Pat. No. 7,418,735, based on International Application PCT/JP01/02807, with a claim of priority to Japanese Applications 2000-102246, filed in Japan on Apr. 4, 2000, and 2000-149848, filed in Japan on May 17, 2000, all of which is incorporated herein by reference.

TECHNICAL FIELD

The present invention relates to a transmitter, signal transfer method, data distribution system and method of same, data receiver, data provider and method of same, and data transferee. More specifically, the present invention relates to a technology for holding in advance information indicating a receiver which does not have the function of being able to copy content using a transferred content signal, and controlling the transfer of a content signal of content or a copyright protected content signal according to whether or not information indicating a connected receiver is included in the held information at the time of transfer of the content.

BACKGROUND ART

In the past, a computer system etc. has converted a digital image signal to an analog image signal and supplied the same to a display device by analog transmission. However, along with the spread of display devices for driving displays by using a digital signal, for example, liquid crystal displays, the method of digitally transferring a digital image signal without converting the same to an analog signal for preventing degradation of the quality of the image or reducing costs has been standardized. For example, the DDWG (Digital Display Working Group) is formulating a DVI (Digital Visual Interface, Version 1.0) specification. This DVI specification uses a TMDS (transition minimized differential signal) channel developed by Silicon Image Corp. of the U.S. to serially transfer a digital three-primary color image signal by the baseband for every color.

FIG. 4 is a conceptual view of a signal transfer system for transferring a digital image signal of content by using a channel of the DVI specification. A transmitter (for example a computer system or set top box) 20 for transmitting the image signal and a receiver (display device, television system, etc.) 50 for receiving the image signal and displaying the image are connected via channels 30 of the DVI specification. In a DVI specification channel, not only is a TMDS channel for transferring a digital image signal used as mentioned above, but also a bi-directional channel ($I^2C$ bus or the like) used for information transfer in a DDC (display data channel) specification relating to plug and play established by VESA (Video Electronics Standard Association) is provided.

Here, if a transmission controller 25 of the transmitter 20 detects that the receiver 50 has been connected, the transmission controller 25 communicates with a reception controller 53 of the receiver 50 according to the DDC protocol, controls an image signal generator 21 based on receiver information obtained from the reception controller 53, for example, information of a model name and resolution of the receiver 50, and generates a digital three-primary color image signal optimum for the receiver 50. The three-primary color image signal DG is supplied to a transmission processor 22 comprised by using a TMDS transmission circuit. The transmission processor 22 generates a baseband serial transfer signal SD from the supplied three-primary color image signal DG and supplies it to the receiver 50 from a connector 27 via the channel 30. The receiver 50 supplies the serial transfer signal SD supplied via a connector 51 to a reception processor 52. The reception processor 52 is comprised by using a TMDS reception circuit and generates the digital three-primary color image signal DS from the serial transfer signal SD and supplies it to an image display 54. For this reason, the image display 54 can optimize and display an image of the content based on the three-primary color image signal DS.

Since the content transferred via the channel 30 of TMDS is converted to the digital signal, a perfect copy can be prepared easily and limitlessly. This is a great advantage for the user, but a problem in terms of protecting the rights of the side providing a movie or Other work. For this reason, a proposal referred to as "DVI-CP (Content Protection)" using encryption technology for copyright protection when transferring a digital signal of content by using a DVI specification channel has been made by Intel Corporation of the U.S.

FIG. 5 is a conceptual view of a signal transfer system for transferring a signal of content compatible with the DVI-CP specification. The image signal generator 21 of a transmitter 20a has a protection information detector 23 connected to it. This protection information detector 23 decides the digital three-primary color image signal DG to be transferred includes protection information indicating that the signal is one of content to be copyright protected. When this protection information detector 23 detects the protection information (when it is decided that the content is to be copyright protected), an encryption circuit 221 provided in a transmission processor 22a encrypts the three-primary color image signal DG and provides this encrypted signal, that is, the three-primary color image signal DGE, to the TMDS signal circuit 222, to generate the serial transfer signal SD.

Also, a reception processor 52a of a receiver 50a is comprised by using not only a TMDS reception circuit 521, but also a decryption circuit 522. The TMDS reception circuit 521 receives the serial transfer signal SD, generates a three-primary color image signal, and supplies it to the decryption circuit 522 for the decryption processing. Here, a transmission controller 25a of the transmitter 20a and a reception controller 53a of the receiver 50a perform processing for mutual authentication according to the DDC protocol and, when deciding that a correct party is connected, supply the encryption key DC used for the encryption of the three-primary color image signal DG to the decryption circuit 522 to enable the decryption circuit 522 to correctly decrypt the encrypted three-primary color image signal. The digital three-primary color image signal DG obtained at this decryption circuit 522 is supplied to the image display 54. Even if the three-primary color image signal DG is transferred encrypted, the image of content can be correctly optimized and displayed on an image display 3.

Also, since the serial transfer signal SD is generated based on the encrypted three-primary color image signal DGE, the unencrypted three-primary color image signal DS cannot be obtained just by receiving the serial transfer signal SD, so the content can be prevented from being digitally copied as it is.

If, however, encryption technology for copyright protection is added to this DVI specification and becomes standard after use of receivers 50 based on the above DVI specification starts, when a transmitter 20a based on the new specification encrypts and outputs a digital image signal, a prior DVI specification receiver 50 sometimes will not be able to display the image since it does not have the function of decrypting an encrypted digital image signal.

For example, as shown in FIG. 6, when outputting a digital image signal from a transmitter 20 based on the conventional DVI specification as a serial transfer signal SD, both a receiver 50 based on the conventional DVI specification or a receiver 50*a* based on the new specification including the encryption technology can display the image of the content. Also, when outputting a digital image signal from a transmitter 20*a* based on the new specification including the encryption technology as the serial transfer signal SD, a receiver 50*a* having the function of decrypting an encrypted digital image signal can display the image of the content. Since the receiver 50 does not have a decryption function however, sometimes the receiver 50 cannot be used for copying content without inviting degradation of the quality of the image etc., for example, it does not have the function of outputting the supplied digital three-primary color image signal or converting the three-primary color image signal to for example an NTSC system video signal for output and therefore cannot display the image of the content even if it is clear that copyright protection is possible.

DISCLOSURE OF THE INVENTION

An object of the present invention is to provide a transmitter and a signal transfer method enabling correct display of an image even if a transmitter for a digital image signal designed for a digital transfer method incorporating encryption technology for copyright protection is connected with a receiver designed for a digital transfer method not incorporating encryption technology for copyright protection.

Another object of the present invention is to provide a data distribution system and a data distribution method enabling a content owner to directly control copying as desired while using a standard apparatus as a processor after the receiver.

Still another object of the present invention is to provide a data receiver used in such a content distribution system, receiving the distributed content data, performing adequate right processing, and outputting the content data in a usable manner.

Still another object of the present invention is to provide a data provider and a data providing method for providing content data to be distributed in a state where the owner of the content can control the usage thereof.

Still another object of the present invention is to provide a data transferer for transferring the data provided in this way.

Accordingly, a transmitter according to the present invention comprises a transmission processing means for transferring a content signal or processing copyright protection to a content signal and then transferring the processed content signal and a transmission controlling means for holding information indicating a receiver which does not have a function enabling copying of content by using the content signal the processed content signal transferred from the transmission processing means and controlling output of the signal to be transferred from the transmission processing means according to whether or not information indicating the receiver which is connected to the transmission processing means is included in the held information.

A signal transfer method according to the present invention includes the steps of holding in a transmitter information indicating receivers not having the function of being able to receive a content signal to copy the content and controlling the output of the content signal or content signal after provided with copyright protection at the transmitter according to whether or not information indicating a connected receiver is included in the held information.

In the present invention, when for example the model names of receivers not having the function of being able to use a transferred content signal to copy the content are held in a transmitter in advance and the model name of a connected receiver is included in the held model names, a non-copyright protected content signal is transferred from the transmitter to the receiver regardless of whether or not the content to be transferred is copyright protected. Also, when a change of the receiver is detected by a hot plug detection function or a plug and play function while transferring a content signal of copyright protected content without providing copyright protection, the transfer of the non-copyright protected content signal is suspended or a copyright protected content signal is transferred instead of the non-copyright protected content signal. Also, the transmitter holds the model name or other information indicating the receiver in a tamper-proof updateable manner.

A data distribution system according to the present invention comprises a data providing means for adding first control information for controlling a usage state of the content data to the intended content data and providing the result as the data to be distributed, a data transmitting means for performing predetermined second encryption on the provided data to be distributed and transmitting the encrypted data to be distributed, and a data receiving means for receiving the transmitted encrypted data to be distributed, performing decryption of the second encryption, detecting the first control 15 information from the decrypted data to be distributed, and controlling the output of the content data based on the detected first control information.

Preferably, the data providing means superimposes the first control information as electronic watermark information on the content data and provides the superimposed content data as the data to be distributed to the data transmitting means, the data transmitting means performs the predetermined second encryption on the provided data to be distributed and transmits the encrypted data to be distributed, and the data receiving means receives the transmitted encrypted data to be distributed, performs the decryption of the second encryption, detects the superimposed first control information from the decrypted data to be distributed, and controls the output of the content data based on the detected first control information.

More preferably, the data providing means performs predetermined first encryption on the content data with the first control information superimposed thereon as the electronic watermark information and provides the encrypted data as the data to be distributed to the data transmitting means, the data transmitting means performs the second encryption for the provided data to be distributed and transmits the encrypted data to be distributed, and the data receiving means receives the transmitted encrypted data to be distributed, performs the decryption of the second encryption, generates the content data with the electronic watermark information superimposed thereon by performing the decryption of the first encryption, detects the superimposed first control information from the generated content data, and controls the output of the content data based on the detected information.

Specifically, the data transmitting means adds second control information for controlling a usage state of the content data to the provided data to be distributed, performs the second encryption on the data to be distributed with the second control information added thereto, and transmits the encrypted data to be distributed, the data receiving means receives the transmitted encrypted data to be distributed, performs the decryption of the second encryption, detects the second control information, generates the content data with the electronic watermark information superimposed thereon by performing the decryption of the first encryption for the decrypted data to be distributed, detects the first control information superimposed as the electronic watermark information from the generated content data, and controls the output of the content data based on the detected first control information and second control information.

More specifically, the data providing means adds a control descriptor indicating the first control information to the content data and provides the content data with the control descriptor added thereto as the data to be distributed to the data transmitting means, the data transmitting means performs the predetermined second encryption for the provided data to be distributed and transmits the encrypted data to be distributed, and the data receiving means receives the transmitted encrypted data to be distributed, performs the decryption of the second encryption, detects the added first control information from the decrypted data to be distributed, and controls the output of the content data based on the detected first control information.

Preferably, the data transmitting means adds second control information for controlling a usage state of the content data to the provided data to be distributed, performs the second encryption for the data to be distributed with the second control information added thereto, and transmits the encrypted data to be distributed, and the data receiving means receives the transmitted encrypted data to be distributed, performs the decryption of the second encryption, detects the second information, performs the decryption of the first encryption for the decrypted data to be distributed to generate content data with the control descriptor added thereto, detects the first control information added as the control descriptor from the generated content data, and controls the output of the content data based on the detected first control information and second control information.

Preferably, the data providing means superimposes third control information for controlling a usage state of the signal when outputting the content data by an analog signal on the content data as the electronic watermark information and provides the content data with the third control information superimposed thereon as the data to be distributed, the data transmitting means performs the predetermined second encryption for the provided data to be distributed, transmits the encrypted data to be distributed, and the data receiving means receives the transmitted encrypted data to be distributed, performs the decryption of the second encryption, and outputs the signal with the decrypted the third control information superimposed thereon as the electronic watermark information as the analog signal output in response to a request.

Preferably, the data receiving means further has a memory means for storing information concerning charging with respect to a usage of the content data based on a usage state of the received content data.

A data distribution method according to the present invention comprises the steps of adding first control information for controlling a usage state of content data to intended content data based on an instruction of an owner of the content data and providing the result as the data to be distributed, performing predetermined second encryption on the provided data to be distributed, transmitting the encrypted data to be distributed, receiving the transmitted encrypted data to be distributed at any receiver, performing the decryption of the second encryption, detecting the first control information from the decrypted data to be distributed, and controlling the output of the content data based on the detected first control information.

A data receiver according to the present invention is a data receiver for receiving a signal comprised of data to be distributed including intended content data plus first control information for controlling a usage state of the content data and transmitted after performing predetermined second encryption, comprising a receiving means for receiving the transmitted signal, a second decrypting means for performing decryption of the second encryption with respect to the received signal, a first control information detecting means for detecting the first control information from the decrypted data to be distributed, and an output controlling means for controlling the output of the content data based on the detected first control information.

A data provider according to the present invention has a control information adding means for adding control information for controlling a usage state of content data designated by an owner of the content data to intended content data and provides the content data with the control information added thereto as data to be distributed.

A data providing method according to the present invention comprises the steps of adding control information for controlling a usage state of content data designated by an owner of content data to intended content data, encrypting the content data with the control information added thereto by a predetermined method, and providing the encrypted content data as the data to be distributed.

A data transferer according to the present invention comprises an encrypting means for further encrypting, by a predetermined method, data to be distributed including intended content data plus control information for controlling a usage state of the content data designated by an owner of the content data and encrypted by a predetermined scheme and a transferring means for transferring the encrypted data to be distributed to any channel.

BRIEF DESCRIPTION OF THE DRAWINGS

The above objects and features of the present invention will become more apparent from the following description given with reference to the accompanying drawings, wherein:

FIG. 2 is a view of a pin arrangement of a connector of the DVI specification.

BEST MODE FOR CARRYING OUT THE INVENTION

Figure 1:
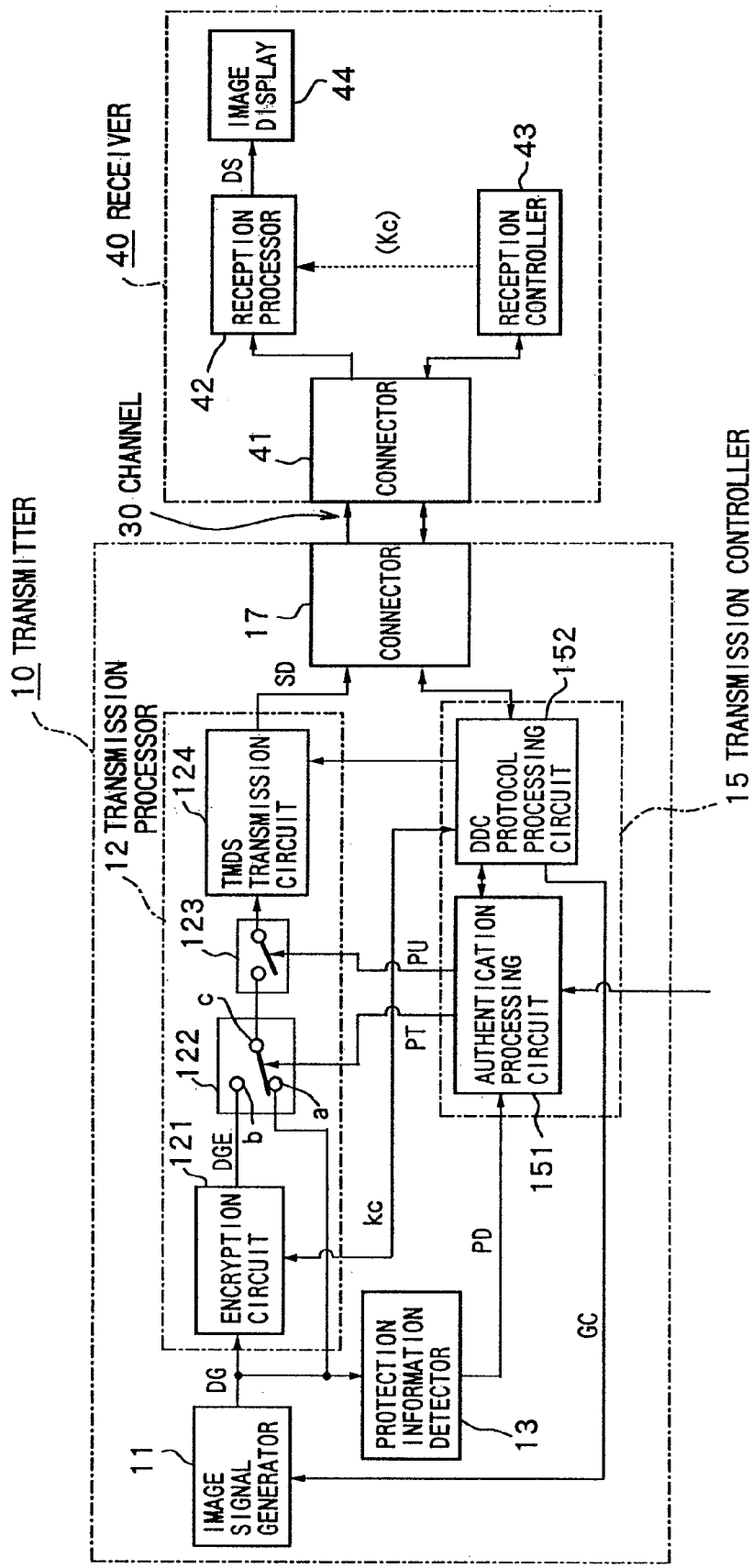
FIG. 1 is a conceptual view of a signal transfer system according to the present invention.

Preferred embodiments of the present invention will be explained next referring to the attached drawings.

First Embodiment

Below, an explanation will be made of a first embodiment of the present invention by referring to the drawings.

FIG. 1 is a conceptual view of a signal transfer system for transferring a digital image signal of content. A transmitter (for example a computer system or set top box) 10 for transmitting the image signal and a receiver (display device, television set, etc.) 40 for receiving the image signal and displaying the image are connected via DVI specification channels 30. The DVI specification channels 30 are provided with a TMDS channel for transferring the digital image signal, a bi-directional channel used for DDC (display data channel) specification information transfer relating to plug and play established by the VESA (Video Electronics Standard Association), a power supply line, and a hot plug detection use signal line.

FIG. 2 is a view of a pin arrangement of a DVI specification connector. Note that the figure shows the case where a channel for transferring an analog image signal is provided. Pins "1" to "5", "9" to "13", and "17" to "24" are for TMDS channels, pins "6" and "7" are for DDC use bi-directional channels ($I^2C$ bus), and pins "C1" to "C5" are for channels for analog image signals. Further, pins "14" and "15" are for a 5V power supply line and a ground line, and a pin "16" is defined as for a hot plug detection use signal line.

An image signal generator 11 of the transmitter 10 shown in FIG. 1 generates a three-primary color image signal DG of the content by a resolution and number of colors optimum with respect to the receiver 40 based on a signal generation control signal GC supplied from a DDC protocol processing circuit 152 mentioned later and supplies the same to an encryption circuit 121 of a transmission processor 12, a terminal a of a signal selection circuit 122, and a protection information detector 13.

The encryption circuit 121 of the transmission processor 12 encrypts the three-primary color image signal DG by for example an encryption key KC and supplies it as the three-primary color image signal DGE to a terminal b of the signal selection circuit 122. A moveable terminal c of the signal selection circuit 122 is connected to one terminal of the output control switch 123, is controlled by a protection operation control signal PT supplied from a authentication processing circuit 151 of a transmission controller 15 mentioned later, and selects either of the non-encrypted three-primary color image signal DG supplied to the terminal a or the encrypted three-primary color image signal DGE supplied to the terminal b.

The other terminal of the output control switch 123 is connected to a TMDS transmission circuit 124. The on/off operation of this output control switch 123 is also controlled by a protection operation control signal PU from the authentication processing circuit 151.

The TMDS transmission circuit 124 encodes the three-primary color image signal selected at the signal selection circuit 122 and supplied via the output control switch 123, tries to balance a DC level and minimize the number of times of inversion of the logic level, and converts the signal to a baseband serial transfer signal SD suitable for transfer. The serial transfer signal SD for each color is output from a connector 17 to a channel 30. Note that a horizontal synchronization signal and a vertical synchronization signal of the three-primary color image signal DG are inserted in a blanking period of for example a blue image signal and transmitted.

The protection information detector 13 detects whether to provide copyright protection according to the copyright protection information of the three-primary color image signal DG and supplies a decision signal PD to the authentication processing circuit 151. As this copyright protection information, use is made of CGMS (copy generation management system) information indicating if the content can be freely copied or copying is prohibited or whether to recognize only one copy or CCI (copy control information) etc. Also, when an analog image signal is supplied to the image signal generator 11 and this analog image signal is transferred converted to a digital signal, it is also possible to decide whether or not to provide copy protection based on an APS (analog protection system) signal for copyright protection used in the analog image signal.

The authentication processing circuit 151 of the transmission controller 15 is comprised using an electrically programmable nonvolatile memory. This authentication processing circuit 151 registers in it classification information of receivers to be connected to the transmitter 10, for example, the model names of the receivers. As the classification information registered in this authentication processing circuit 151, classification information indicating the receivers not having a function for copying the content without inviting degradation of the quality of image etc., for example, classification information indicating the receivers not having a function for outputting the supplied digital image signal or converting the digital image signal to for example an NTSC system video signal and outputting the same is registered. Also, the authentication processing circuit 151 decides whether or not the model name of the receiver indicated by hardware information RR supplied from the DDC protocol processing circuit 152 mentioned later is registered and generates the protection operation control signals PT and PU and supplies them to the transmission processor 12 based on this decision result and the decision signal PD supplied from the protection information detector 13.

The DDC protocol processing circuit 152 communicates with the receiver 40 via the connector 17 and the channels 30 in accordance with the DDC protocol and supplies the hardware information RR supplied from the receiver 40 to the authentication processing circuit 151. Also, the DDC protocol processing circuit 152 performs the authentication processing with the connected receiver 40 based on the decision result at the protection information detector 13 so as to decide whether or not the connected receiver 40 is based on the new specification including the encryption technology for copyright protection. Here, when it is confirmed that the receiver 40 is based on the new specification, the circuit performs processing for supplying the encryption key KC used when encrypting the three-primary color image signal DG to the receiver 40. Note that the encryption key KC may be held in the DDC protocol processing circuit 152, may be supplied from the DDC protocol processing circuit 152 to the encryption circuit 121, or may be read out by the DDC protocol processing circuit 152 from the encryption circuit 121 when supplying the encryption key KC to the receiver 40.

Further, the DDC protocol processing circuit 152 generates the transfer control signal, TC and supplies the same to the TMDS transmission circuit 124 so as to control the generation and transfer processing of the baseband serial transfer signals SD performed at the TMDS transmission circuit 124.

A connector 41 of the receiver 40 has a reception processor 42 and a reception controller 43 connected to it. The reception processor 42 generates the three-primary color image signal DS based on received serial transfer signal SD and supplies it to a display 44. When a decryption circuit for decrypting the encrypted three-primary color image signal is provided in the reception processor 42 and the encryption key KC transferred from the transmitter 10 is supplied from the reception controller 43, the circuit performs the decryption processing of the encrypted three-primary color image signal using this encryption key KC.

Figure 3:
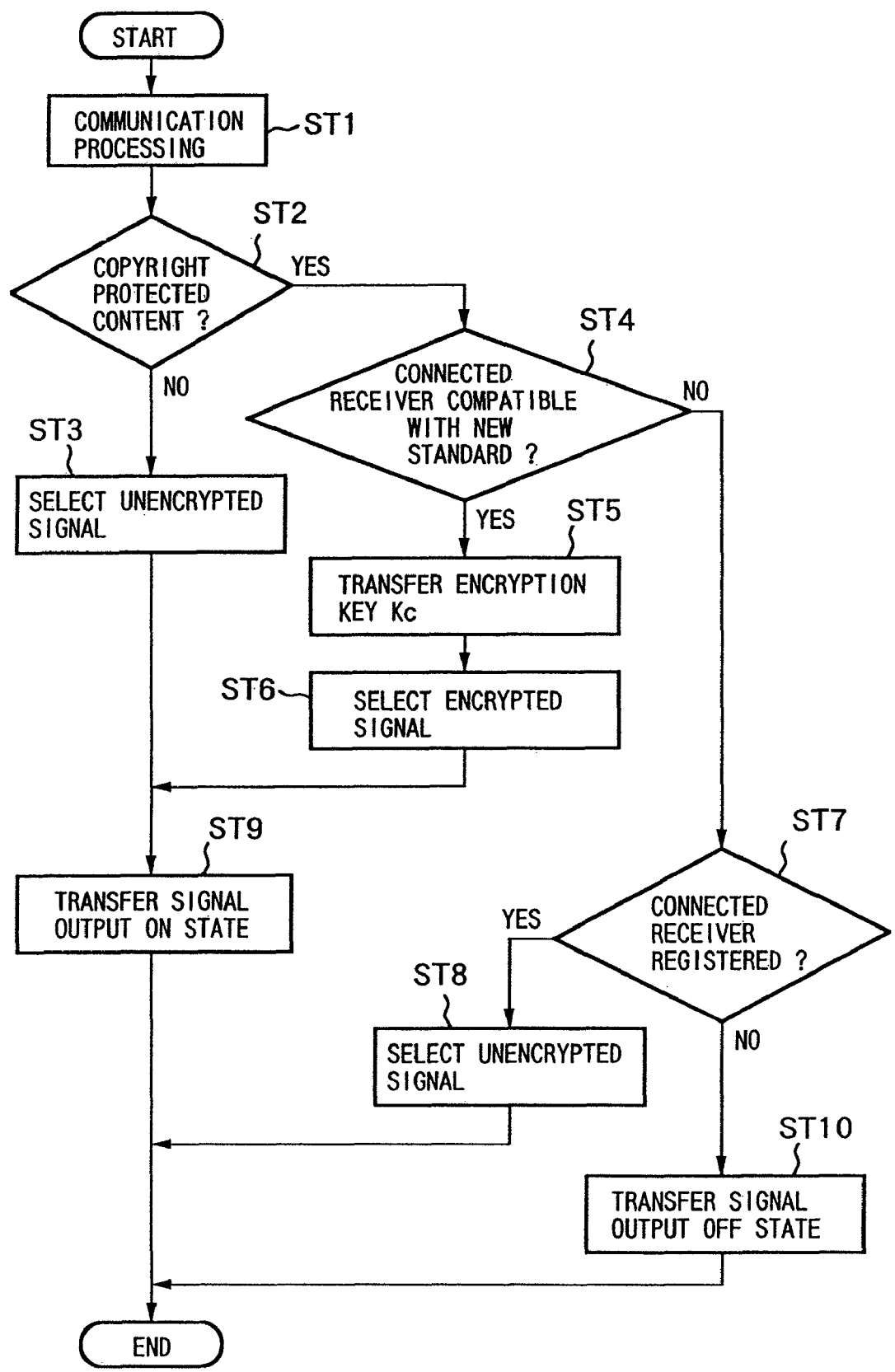
FIG. 3 is a flowchart of an operation of a transmitter.
Figure 4:
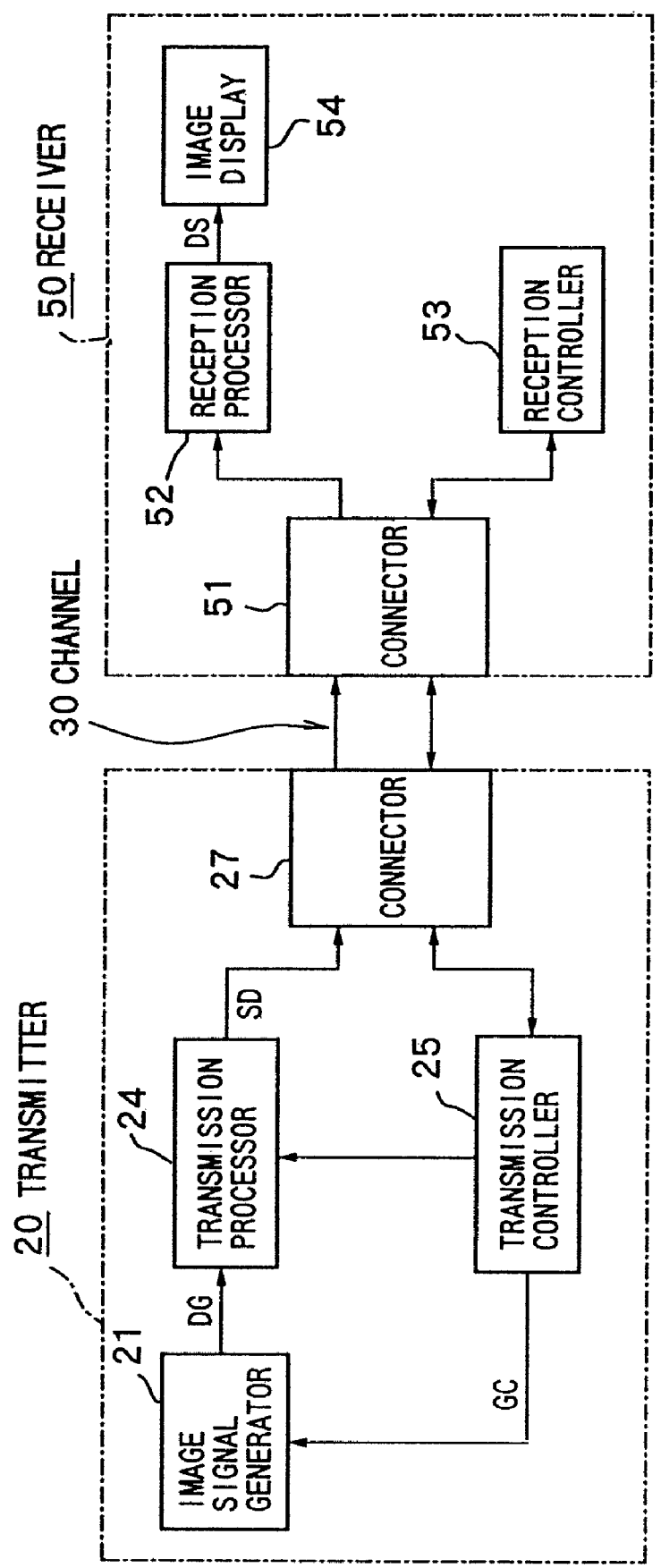
FIG. 4 is a conceptual view of a signal transfer system of the DVI specification.
Figure 5:
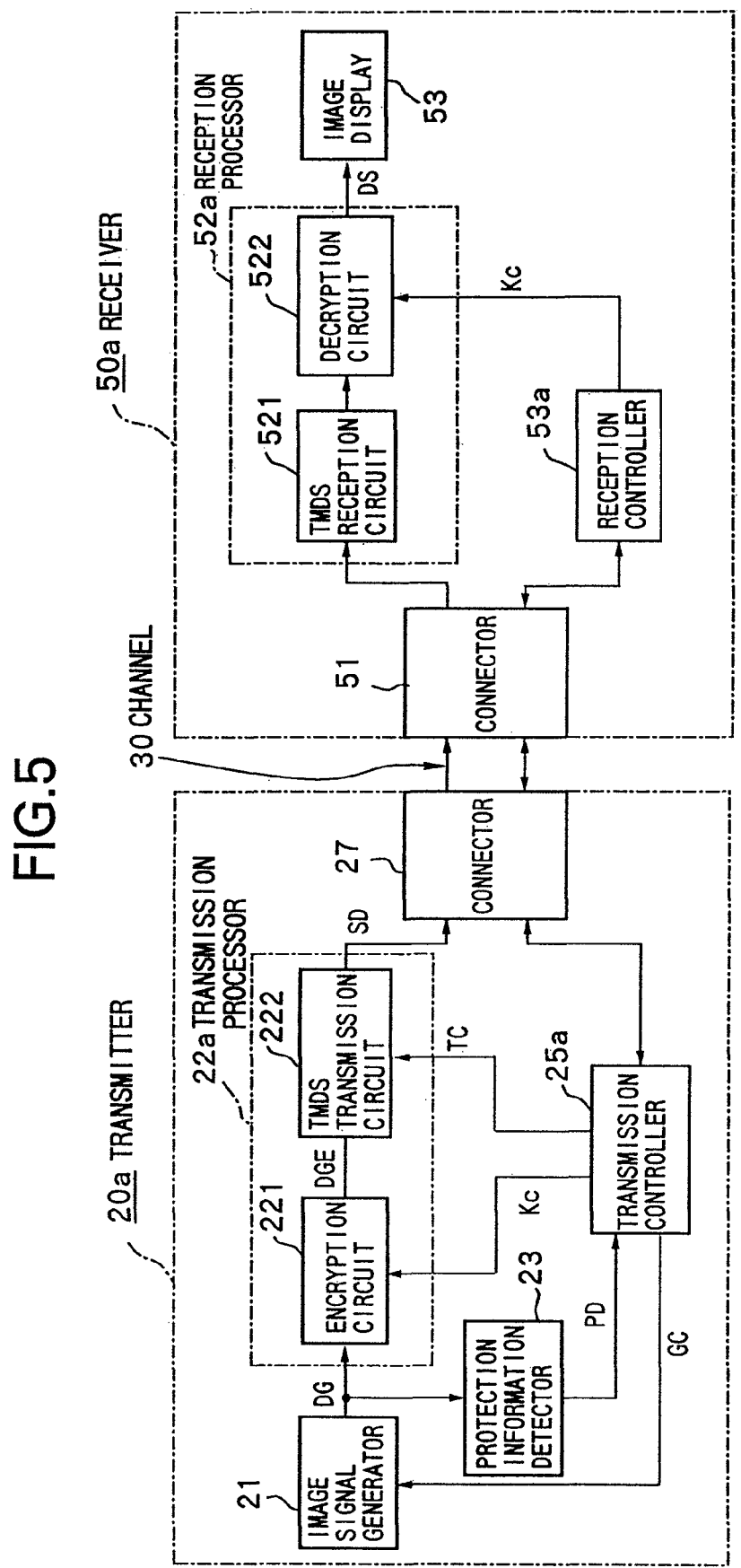
FIG. 5 is a conceptual view of a signal transfer system designed for the DVI-CP specification.
Figure 6:
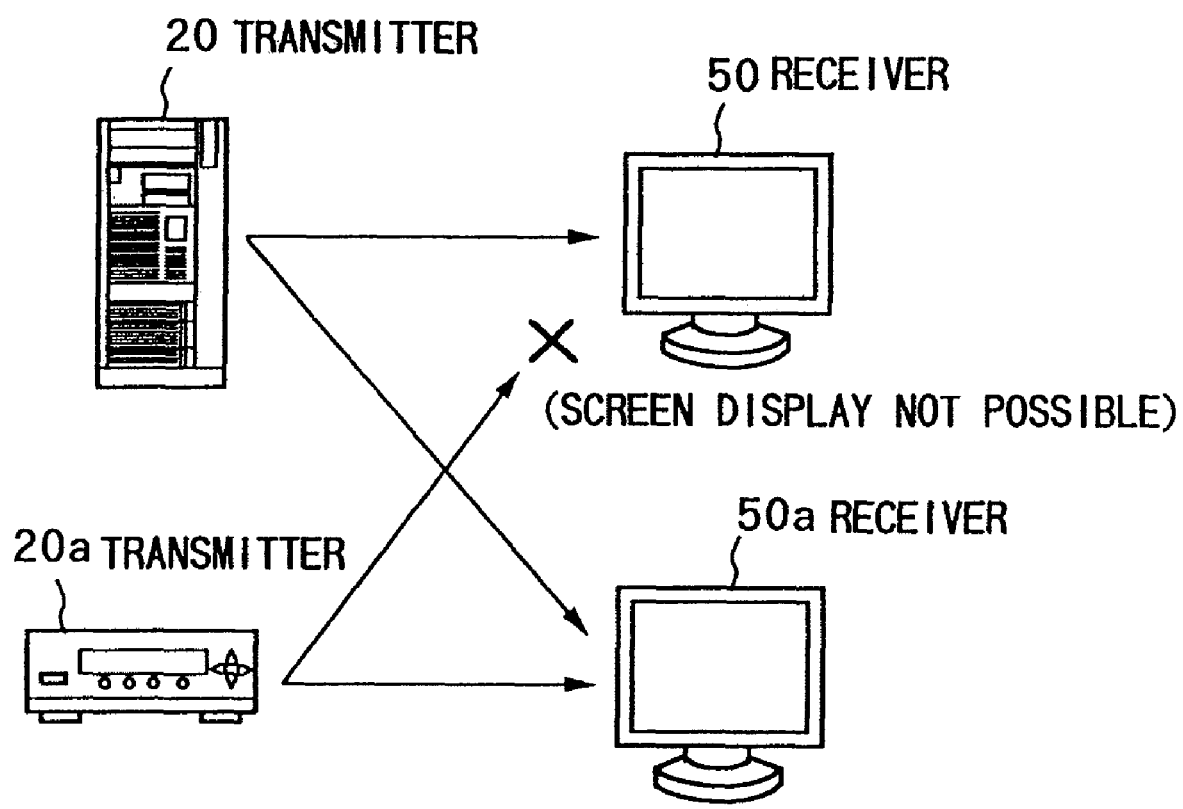
FIG. 6 is a view of compatibility of hardware based on the DVI specification and hardware based on the DVI-CP specification.

Next, an explanation will be made of the operation of the transmitter 10 by using the flowchart of FIG. 3. At step ST1, the transmitter communicates with the connected receiver 40 to obtain the model name, resolution, or other hardware information relating to the receiver 40 and generates a signal generation control signal GC based on this hardware information for supply to the image signal generator 11.

At step ST2, it is decided based on the decision signal PD whether or not the content supplied from the transmitter 10 to the receiver 40 is copyright protected. Here, when it is decided based on the decision signal PD from the protection information detector 13 that the content is not copyright protected, the routine proceeds to step ST3, where the moveable terminal c of the signal selection circuit 122 is set to the terminal a side by the protection operation control signal PT and the unencrypted three-primary color signal DG is selected, then the routine proceeds to step ST9.

Also, when it is decided at step ST2 that the content is copyright protected, the routine proceeds to step ST4, where the authentication processing with the receiver 40 is carried out, and it is decided whether or not the connected receiver 40 is based the new specification including the encryption technology for copyright protection. This authentication processing assumes that for example a common key method is utilized, sends the data from the transmitter 10 to the receiver 40, and encrypts and returns the data by the common key held at the receiver 40. If this returned encrypted data is inversely converted by the common key and it can be confirmed that the transmitted data appears, it can be correctly decided that the receiver is based on the new specification. Also, if a public key system is utilized, the data is encrypted by the public key of the receiver 40 and sent from the transmitter 10, the data decrypted by a secret key is returned from the receiver 40, and it can be confirmed that this returned data is equal to the data which was encrypted and transmitted, it can be correctly decided that the receiver is based on the new specification.

When it is decided at step ST4 that the receiver 40 is based on the new specification, the routine proceeds to step ST5, where the encryption key KC used at the encryption circuit 121 is supplied from the DDC protocol processing circuit 152 to the reception controller 43, then the routine proceeds to step ST6.

At step ST6, the moveable terminal c of the signal selection circuit 122 is set to the terminal b side by the protection operation control signal PT so as to select the encrypted three-primary color image signal DGE, then the routine proceeds to step ST9.

When it is not decided at step ST4 that the receiver 40 is based on the new specification, the routine proceeds to step ST7, where it is decided whether or not the model name of the receiver 40 indicated by the hardware information RR supplied from the DDC protocol processing circuit 152 is registered in the authentication processing circuit 151. Here, when it is decided that the model name of the receiver is registered and the receiver does not have a function enabling it to copy content without inviting degradation of the quality of image etc., the routine proceeds to step ST8. Also, when it is not registered, the routine proceeds to step ST10.

At step ST8, the moveable terminal c of the signal selection circuit 122 is set to the terminal a side by the protection operation control signal PT so as to select the unencrypted three-primary color image signal DG, then the routine proceeds to step ST9.

When the routine proceeds from step ST3 or step ST6 or step ST8 to step ST9, the output control switch 123 is turned on by the protection operation control signal PU to generate the serial transfer signal SD based on the unencrypted three-primary color image signal DG or the encrypted three-primary color image signal DGE selected at the signal selection circuit 122 and transmit it to the receiver 40. Also, when the routine proceeds from step ST7 to step ST10, at step ST10, the output control switch 123 is turned off by the protection operation control signal PU and the transfer of the serial transfer signal SD based on the three-primary color image signal DG or DGE is prohibited.

When copyright protection of the content to be transferred is necessary in this way; when a receiver based on the new specification including encryption technology for copyright protection is connected, the content is transmitted encrypted, so illicit copying of the content can be prevented. Also, even if a receiver 40 not based on the new specification is connected, when it is confirmed that this connected receiver is hardware not having a function of copying the content, the content is transmitted without being encrypted, therefore not only can illicit copying of the content be prevented, but also even a receiver not based on the new specification can be made to correctly display the image of the content.

Further, while a digital image signal of content requiring encryption is being transmitted without encryption, it is monitored whether or not there has been a change of connection of the receiver, that is, if the receiver 40 connected to the transmitter 10 has been disconnected or the receiver 40 has been changed. A change of connection of the receiver is monitored by utilizing for example the hot plug detection function or plug and play function. Here, if the hot plug detection function is utilized, it can be decided whether or not the connection of the receiver was changed according to whether or not the receiver was disconnected by the hot plug detection use signal line. Also, if the plug and play function is utilized, it is possible to perform the processing for confirmation of the receiver by the plug and play function even during the transfer of the image signal and therefore decide whether or not there has been a change in connection of the receiver during the transfer of the image signal.

When it is decided that there has not been a change in connection during this monitoring of a change of connection of the receiver, the output control switch 123 is held in the on state by the protection operation control signal PU, while when it is decided that there has been a change in connection, the signal selection circuit 122 and the output control switch 123 are controlled by the protection operation control signals PT and PU so that the unencrypted three-primary color image signal DG is not transmitted. For example, by turning the output control switch 123 off by the protection operation control signal PU, the transfer of the unencrypted three-primary color image signal DG can be stopped. Also, by switching the moveable terminal c of the signal selection circuit 122 to the terminal b side by the protection operation control signal PT and selecting the encrypted three-primary color image signal DGE, the unencrypted three-primary color image signal DG can be prevented from being transferred.

In this way, even when there is a change in the connection of the receiver while the image signal of the content is being transferred without encryption and, for example, a receiver having a function for copying content without inviting degradation of the quality of image etc. is connected, the unencrypted three-primary color image signal DG is no longer automatically transferred, so the illicit copying of the content can be prevented.

The authentication processing circuit 151 is configured using a programmable nonvolatile memory, so new model names can be added to the authentication processing circuit 151. Here, if the information registered in the authentication processing circuit 151 were tampered with and the model name of a receiver having a function for copying the content without inviting degradation of the quality of image etc. were registered, the content could be illicitly copied.

For this reason, the authentication processing circuit 151 uses a means having a high safety so as to prevent the stored information from being tampered with. For example, the hardware is configured so that the information is lost at the time of reverse engineering of the authentication processing circuit 151 or the circuit is configured to make analysis of the information difficult. Also, when updating the stored information, in the same way as the above authentication processing, it is decided whether or not the hardware connected to the transmitter for updating the stored information is correct by utilizing the common key system or the public key system and the update of the stored information is permitted only when it is decided that the apparatus is correct. Further, when the transmitter is hardware such as a set top box, it is also possible to encrypt the information to be updated and supply it to the set top box from the broadcast station side by using the information transmission use channel and have the set top box decrypt the encrypted information by using the secret key stored in an IC card or the like unique to the viewer and update the stored information by using the decrypted information. Also, the transmitter is a computer system.

Note that, in the first embodiment, whether or not the content is copyright protected is determined by using a three-primary color image signal DG, but even if information on whether or not the three-primary color image signal DG must be processed for copyright protection is supplied by the image signal generator 11 to the transmission controller 15, it is possible to similarly operate the transmitter 10. Further, the signal of the content to be transferred is not limited to an image signal and of course may also be a voice signal.

In this way, according to the first embodiment, even if a receiver not based on this new specification is connected to a transmitter based on the new specification including the encryption technology for copyright protection, it is possible to register this receiver not based on the new specification in the transmitter so as to enable a signal output from a transmitter based on the new specification to be received at the receiver not based on the new specification and the content to be used.

Second Embodiment

Next, the content distribution system and content distribution method enabling a content owner to directly control copying as desired while using a standard apparatus as the processing apparatus after the receiver will be explained as a second embodiment of the present invention by referring to FIG. 13 to FIG. 15.

Overall Configuration

First, an overall configuration of the content distribution system of the second embodiment will be explained by referring to FIG. 7.

Figure 7:
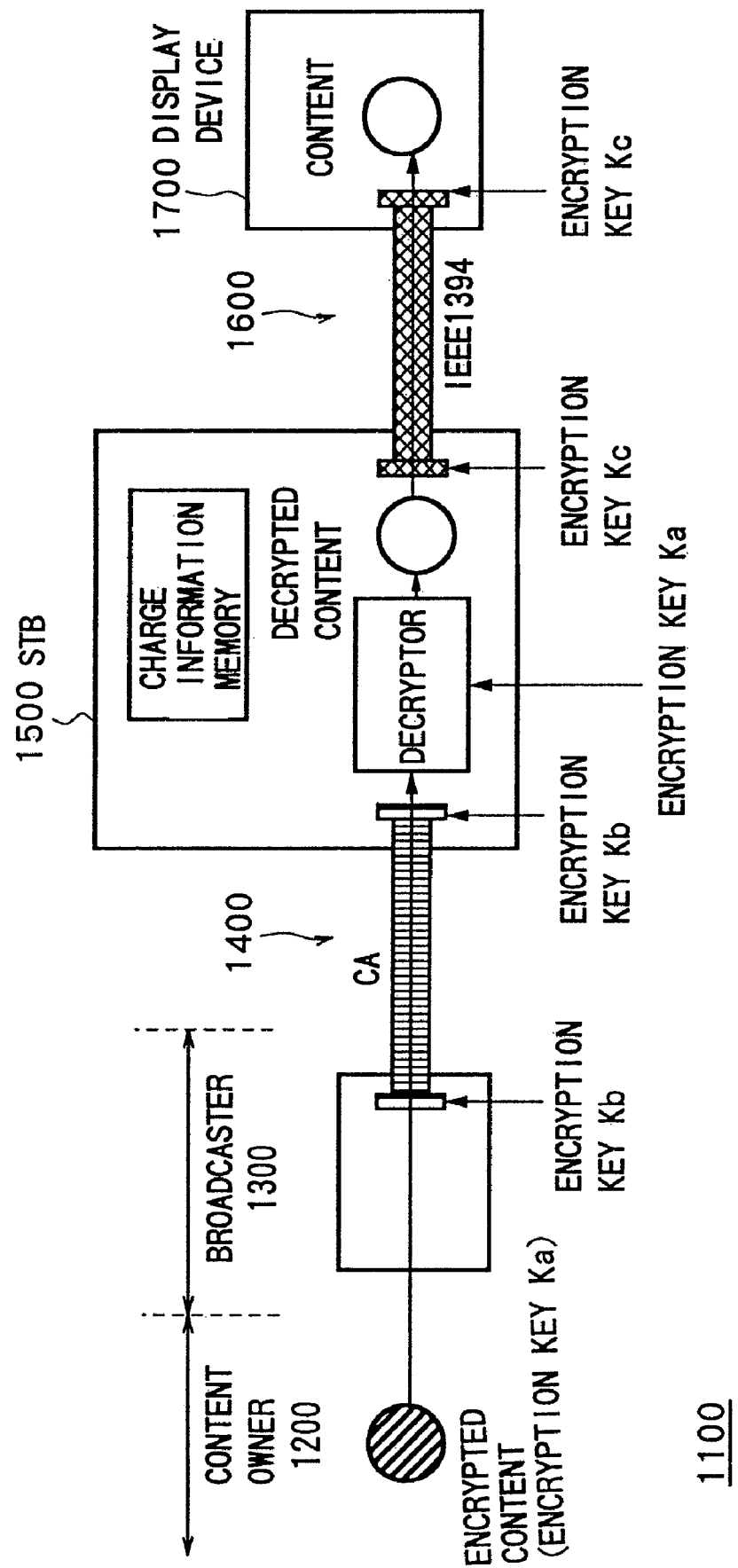
FIG. 7 is a view of an overall schematic configuration of a content distribution system of a second embodiment of the present invention.

FIG. 7 is a view of the overall schematic configuration of a content distribution system 1100 of the second embodiment.

The content distribution system 1100 has a content owner 1200, broadcaster 1300, broadcast network 1400, set top box 1500, display device I/F 1600, and display device 1700.

First, the configuration of each part will be explained.

The content owner 1200 is the owner of the content to be distributed, encrypts the content to be distributed by using a desired encryption key Ka, and provides the content in the encrypted state to the broadcaster 1300.

In the present embodiment, the "content" means content including images and sound, for example, TV programs or movies.

Note that the "encryption" referred to here broadly means processing the content data itself or any additional data or the like desired by the content owner 1200 to a state preventing it from being changed in any way, read, or used. Accordingly, it specifically includes superimposing additional data in the form of an electronic watermark etc. when actually encrypting content data. Note that, the actual concrete processing content will be explained at the later more concrete explanation of the configuration.

The broadcaster 1300 further performs encryption for conditional access by using an encryption key Kb on the content in the encrypted state provided by the content owner 1200 and distributes the same via the broadcast network 1400.

The broadcast network 1400 is any data distributing means including any data distribution system via the communication network going through a communication network such as a digital ground wave broadcast, digital satellite broadcast, CATV, or the Internet and distributes the content data transferred by the broadcaster 1300 to any user.

The set top box 1500 is a receiver provided in for example the home of each user and receiving the data transferred by the broadcaster 1300 via the broadcast network 1400 based on an operation of the user.

The set top box 1500 decrypts the content data by using the encryption key Ka delivered based on for example a contract in advance when receiving the content data selected by the user. Then, it encrypts the decrypted content data again by using the encryption key Kc set in advance and transfers it to the display device I/F 1600. In the present embodiment, the set top box 1500 and the display device 1700 are connected using IEEE1394 as the interface, then the set top box 1500 encrypts the content data again by the 5C encryption scheme defined in the IEEE1394.

The display device I/F 1600 is a connecting means between the set top box 1500 and the display device 1700 and is the IEEE1394 in the present embodiment as mentioned before.

The display device 1700 decrypts the encrypted content data input from the set top box 1500 via the display device I/F 1600 by using the encryption key Kc set in advance and displays the same in a user-viewable manner.

Next, the basic overall operation of the content distribution system 1100 having such a configuration will be explained.

First, the content to be distributed is encrypted by the owner, that is, the content owner 1200, by using the encryption key Ka, then transferred to the broadcaster 1300, then is further encrypted for conditional access by the broadcaster 1300 by using the encryption key Kb and transferred to the broadcast network 1400.

The data transferred to the broadcast network 1400 is specifically substantially received by the viewer (user of the content) selected to be viewed from the set top box 1500 operated by the user and the encryption for the conditional access is first decrypted by an internal decryptor. The encryption key Ka at this time is provided in the form of a secure storage medium such as an IC card when the user concludes a reception contract with the broadcaster 1300 in advance.

The decrypted content data is encrypted again by the 5C scheme of the IEEE1394 by using the encryption key Kc set in advance and is transferred to the display device 1700.

Then, it is decrypted at the display device 1700 and displayed in a user viewable manner.

Note that the operation performed by the viewer on the set top box 1500 such as the selection of the content data to be received and the transfer of the content data from the set top box 1500 to the display device 1700 is successively stored in the charge information memory in the set top box 1500 and used for the charging accompanying the reception of content.

In this way, in the content distribution system 1100, the content owner 1200 itself substantially encrypts the content to be distributed. The encryption is not decrypted until the set top box 1500 of the user. Accordingly, if the control information for controlling for example the reproduction or copying of the content data on the user side is encrypted and superimposed on the content data, the content owner 1200 itself can control the usage of the content data on the user side. Namely, a change of the usage state, usage conditions, etc. of the content set by the broadcaster 1300 can be prevented regardless of the reason.

Also, in the content distribution system 1100, a standard interface can be used between the set top box 1500 and the display device 1700 while placing the usage of the content within a range of such control of the content owner 1200. Also, the standard hardware compatible with that interface can be used as the display device 1700.

EXAMPLE OF CONCRETE APPLICATION

The basic overall configuration of the content distribution system 1100 according to the present invention was explained above, but an example of a more concrete configuration and concrete form of application will be explained as a first concrete example to fifth concrete example.

Note that all of the broadcast network 1400, display device I/F 1600, and display device 1700 are standard, therefore, in the following explanation, the illustration of these in the drawings and explanations thereof will be omitted.

First Concrete Example

A first example of concrete application of the content distribution system 1100 will be explained by referring to FIG. 8.

As the first concrete example, a system wherein the content owner 1200 superimposes the control information for controlling the usage of the content on the content data in the form of an electronic watermark and distributes the same and wherein the usage of the content data received by the user is controlled by this will be illustrated.

Figure 8:
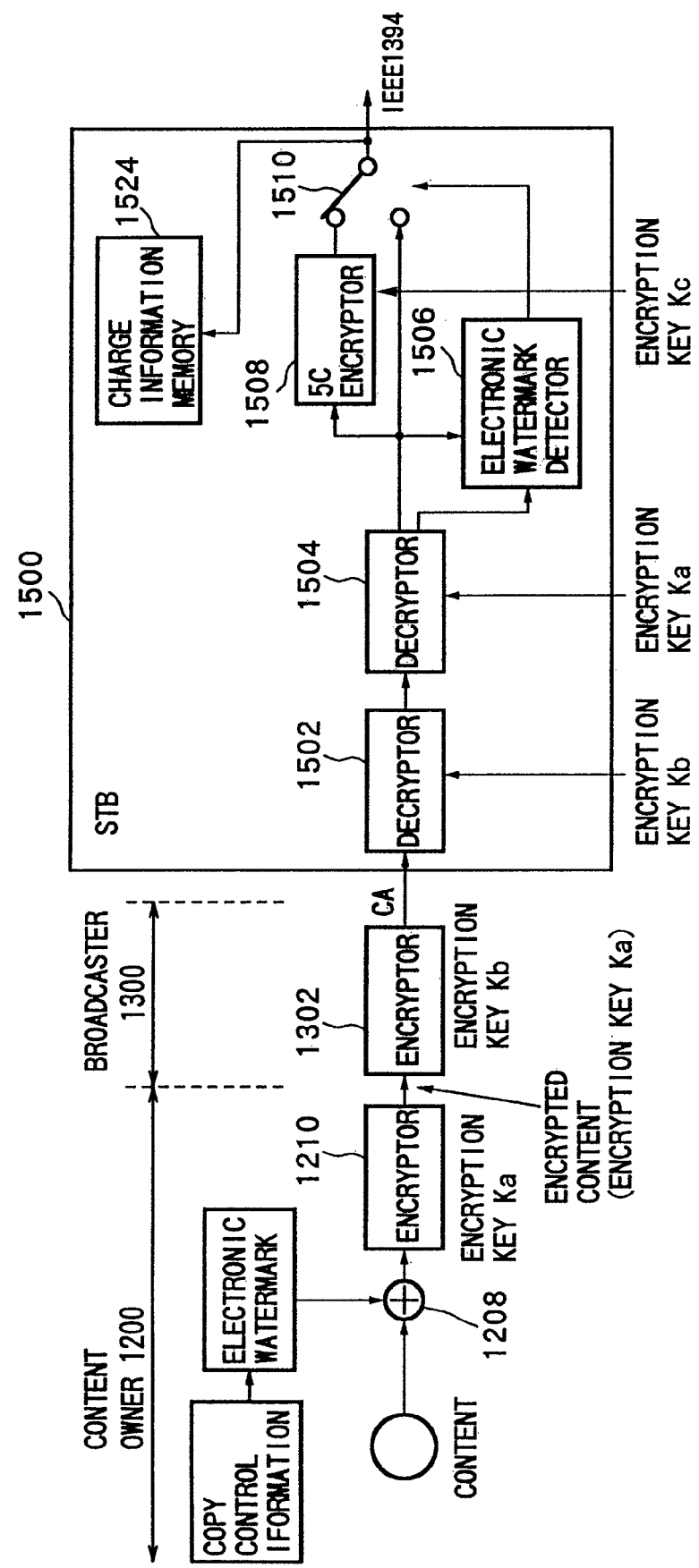
FIG. 8 is a view of the configuration of a principal part of a first concrete example of the content distribution system shown in FIG. 7.

FIG. 8 is a view of the configuration of the content owner 1200 to the set top box 1500 of the first concrete configuration of the content distribution system 1100.

In the first concrete configuration shown in FIG. 8, the content owner 1200 has an electronic watermark superimposer 1208 which superimposes the copy control information for controlling the usage of the content which becomes valid in the set top box 1500 on the content data in the form of an electronic watermark.

Further, the content owner 1200 has an encryptor 1210 which encrypts the content data with the electronic watermark superimposed thereon by using the encryption key Ka.

Then, it transfers this encrypted content data to the broadcaster 1300.

The broadcaster 1300 has the encryptor 1302 which further performs encryption for conditional access by using the encryption key Kb on the content data input from the content owner 1200 and transmits the same.

The set top box 1500 has a decryptor 1502, decryptor 1504, electronic watermark detector 1506, 5C encryptor 1508, output switch 1510, and charge information memory 1524.

The decryptor 1502 decrypts the encrypted signal received from the broadcaster 1300 by using the encryption key Kb. Namely, it decrypts the encryption for the conditional access. The decrypted signal is the signal encrypted by the content owner 1200 and can not yet used.

The decryptor 1504 further decrypts the signal decrypted at the decryptor 1502 by using the encryption key Ka and outputs the decrypted signal to the electronic watermark detector 1506, 5C encryptor 1508, and the output switch 1510. The signal decrypted at the decryptor 1504 is the signal obtained by the superimposition of the copy control information on the baseband content data as the electronic watermark.

The electronic watermark detector 1506 detects the copy control information superimposed as the electronic watermark from the signal decrypted at the decryptor 1504, generates the signal for controlling the signal to be output from the set top box 1500, concretely the signal for controlling the output switch 1510 based on this, and applies the same to the output switch 1510.

The 5C encryptor 1508 encrypts the signal decrypted at the decryptor 1504 by the 5C scheme by using the encryption key Kc and applies the same to the output switch 1510.

The output switch 1510 selects either of the unencrypted content data output from the decryptor 1504 or the content data encrypted at the 5C encryptor 1508 as the output signal from the set top box 1500 based on the control signal applied from the electronic watermark detector 1506 and outputs the same from the set top box 1500.

The charge information memory 1524 detects and stores the information relating to the charge accompanying the usage of the content data by detecting the signal substantially output from the set top box 1500 or monitoring the information input from the display device 1700 via the IEEE1394. The information stored in the charge information memory 1524 is suitably transmitted to a predetermined settlement manager where the charge processing is performed.

In such a set top box 1500, the encryption for the conditional access applied at the decryptor 1502 by the broadcaster 1300 is decrypted, the encryption applied by the content owner 1200 itself is decrypted at the decryptor 1504, and the copy control information added by the content owner 1200 superimposed as the electronic watermark is detected at the electronic watermark detector 1506 from that decrypted content data.

Then, when for example this copy control information describes to output the encrypted content data from the set top box 1500, the data obtained by encrypting the output from the decryptor 1504 at the 5C encryptor 1508 using the encryption key Kc is selected by the output switch 1510 based on the control signal from the electronic watermark detector 1506 and output from the set top box 1500 to a not illustrated display device.

Also, when the copy control information describes that unencrypted content data can be output from the set top box 1500, the output from the decryptor 1504 is selected by the output switch 1510 based on the control signal from the electronic watermark detector 1506 and output from the set top box 1500.

In this way, in the first concrete example, the content owner 1200 superimposes the copy control information on the content data in the form of the electronic watermark and further performs encryption. The content owner 1200 itself can directly control the output of the reception side without intervention by the broadcaster 1300.

Second Concrete Example

Figure 9:
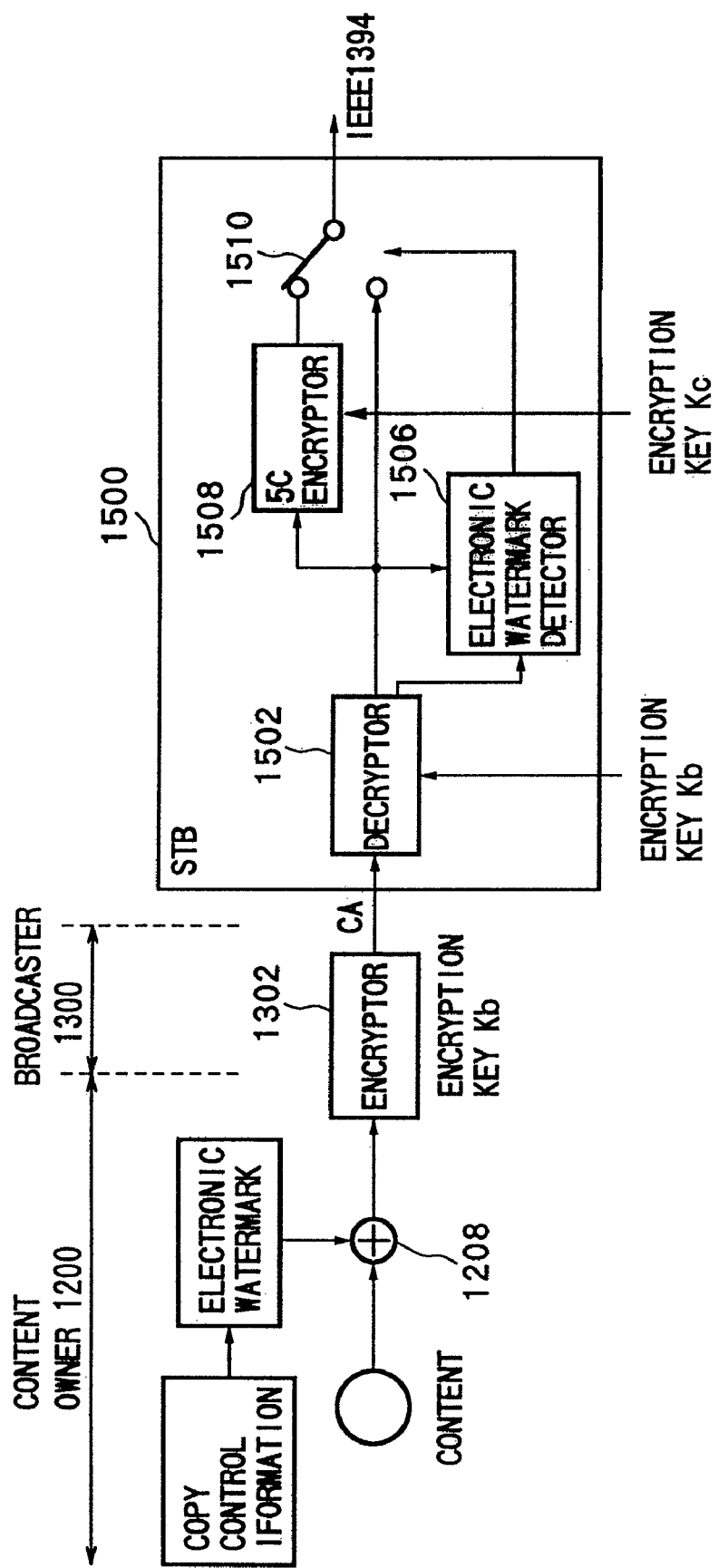
FIG. 9 is a view of the configuration of a principal part of a second concrete example of the content distribution system shown in FIG. 7.

A second example of concrete application of the content distribution system 1100 will be explained next by referring to FIG. 9.

The second concrete example is configured as the first concrete example without the encryptor 1210 of the content owner 1200 and omitting the encryption processing. Also, along with this, the set top box 1500 is also configured omitting the decryptor 1504.

In such a configuration, the content owner 1200 superimposes the copy control information in the form of an electronic watermark at the electronic watermark superimposing unit 1208 and provides the content data in that state to the broadcaster 1300 as it is, that is, without encryption.

Then, the broadcaster 1300 performs the encryption for the conditional access on this at the encryptor 1302 and transfers the result.

The set top box 1500 receiving the transferred signal decrypts the encryption for conditional access at the decryptor 1502 to directly obtain content data not encrypted in any way, detects the copy control information superimposed as the electronic watermark at the electronic watermark detector 1506, and controls the output switch 1510 by this.

The operations of the 5C encryptor 1508, output switch 1510, not illustrated charge information memory, etc. are the same as those of the first concrete example.

In this way, the second concrete example omits the encryptor 1210 in the content owner 1200 and the decryptor 1504 of the set top box 1500, so can simplify the configurations of the devices.

In such a configuration, the encryption processing by the encryptor 1210 of the content owner 1200 is eliminated, therefore the content data in the unencrypted state is transferred to the broadcaster 1300. The output of the set top box 1500, however, is controlled by the electronic watermark information. Further, the electronic watermark data is superimposed. Therefore, illicit usage can be traced, so the possibility of illicit usage can be said to be low.

If such a condition is acceptable, this simple configuration second concrete example is effective.

Third Concrete Example

Figure 10:
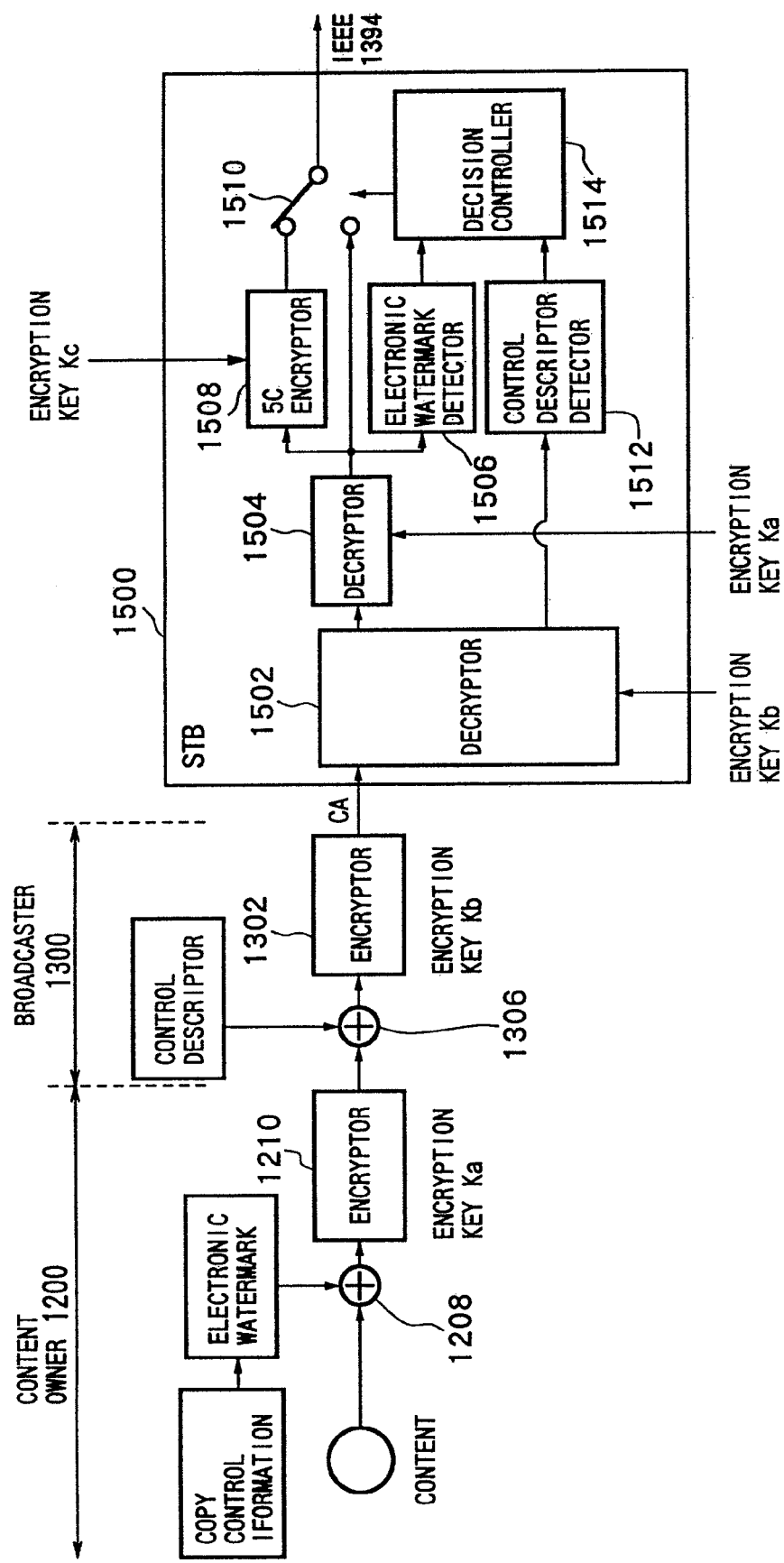
FIG. 10 is a view of the configuration of a principal part of a third concrete example of the content distribution system shown in FIG. 7.

An explanation will be made of a third concrete application example of the content distribution system 1100 by referring to FIG. 10 and FIG. 11.

The third concrete example is configured by the broadcaster 1300 adding a unique control descriptor separate from that added by the content owner 1200.

Specifically, the processing in the content owner 1200 is the same as the processing of the first concrete example. First the copy control information for controlling the usage of the content which becomes valid in the set top box 1500 is superimposed on the content data in the form of an electronic watermark. Next, the encryptor 1210 encrypts the content data with the electronic watermark superimposed thereon by using the encryption key Ka and transfers this encrypted content data to the broadcaster 1300.

The broadcaster 1300 adds the unique control descriptor to the encrypted content data transferred from the content owner 1200 in a control descriptor adder 1306, encrypts this in the encryptor 1302 by using the encryption key Kb, and transmits the same.

The set top box 1500 receiving this decrypts the encryption for the conditional access performed by the broadcaster 1300 in the decryptor 1502 by using the encryption key Kb.

From this decrypted signal, the control descriptor added by the broadcaster 1300 is detected at the control descriptor detector 1512 and output to a decision controller 1514.

Also, the signal decrypted at the decryptor 1502 is further-decrypted at the decryptor 1504 by using the encryption key Ka.

The electronic watermark detector 1506 detects the copy control information superimposed in the form of an electronic watermark by the content owner 1200 from this decrypted signal and outputs it to the decision controller 1514.

The decision controller 1514 performs the decision for controlling the usage of the received content data based on the copy control information set by the content owner 1200 and input from the electronic watermark detector 1506 and the control descriptor set by the broadcaster 1300 and input from the control descriptor detector 1512 and controls the output data based on that decision.

Here, it is assumed that the copy control information and the control descriptor set to output the content data from each set top box 1500 by either transfer by 5C encryption or by transfer without encryption. In that case, the decision controller 1514 performs a decision according to the flowchart as shown in for example FIG. 11.

Namely, when the decision is started (step S10), first, the copy control information input from the electronic watermark detector 1506 is referred to so as to judge whether it sets 5C encryption (step S11). When it sets 5C encryption, a control signal for selecting the output of the 5C encryptor 1508 is output to the output switch 1510, whereby 5C encrypted content data is output from the set top box 1500 (step S12).

When the copy control information input from the electronic watermark detector 1506 does not set 5C encryption (step S11), the control descriptor input from the control descriptor detector 1512 is referred to so as to judge whether or not it sets 5C encryption (step S13). Then, when it sets 5C encryption, in the same way as the case where the copy control information sets it, a control signal for selecting the output of the 5C encryptor 1508 is output to the output switch 1510, whereby 5C encrypted content data is output from the set top box 1500 (step S12).

Even when the control descriptor input from the control descriptor detector 1512 does not set 5C encryption (step S13), the decision controller 1514 outputs a control signal for selecting the output from the decryptor 1504 to the output switch 1510 to make the set top box 1500 output the unencrypted content data (step S14).

In this way, the third concrete example enables the content owner 1200 and the broadcaster 1300 to independently set control of the usage of the content data. Then, it is possible to freely set which setting should be given priority and what kind of control is to be carried out by changing an algorithm set in the decision controller 1514.

Figure 11:
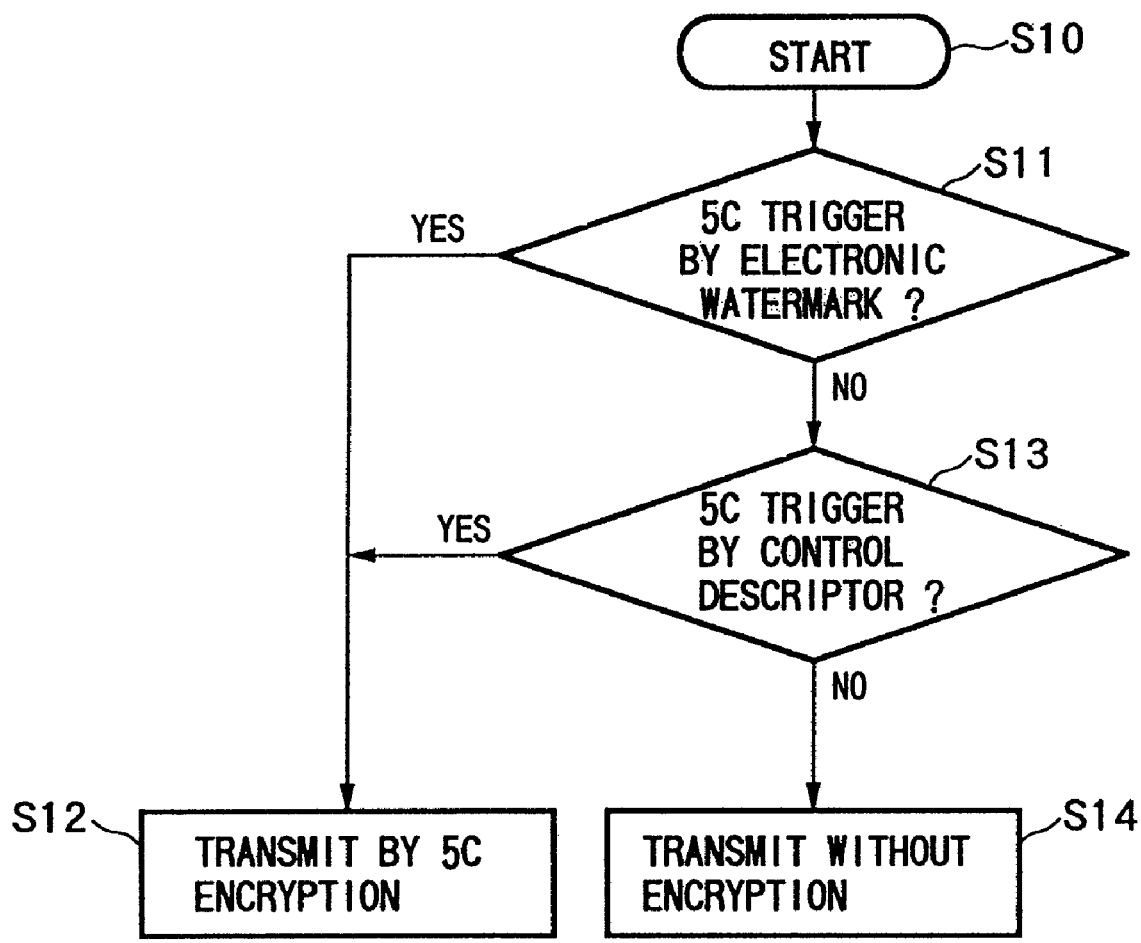
FIG. 11 is a flowchart for explaining decision processing in a decision controller of a set top box shown in FIG. 10.

BAy employing the algorithm as shown in for example FIG. 11, it is possible to execute the setting of the content owner 1200 with priority over the setting of the broadcaster 1300.

Fourth Concrete Example

Figure 12:
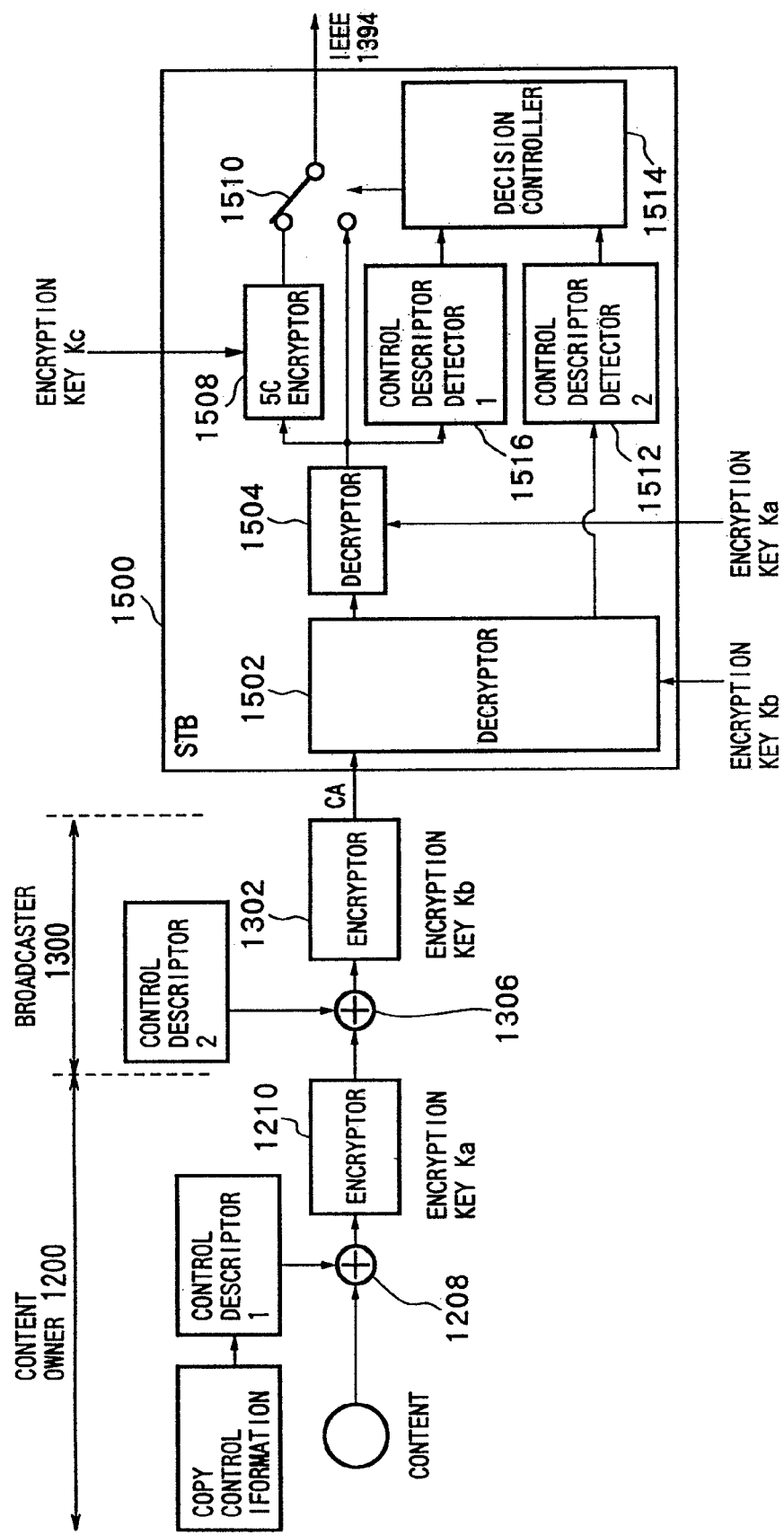
FIG. 12 is a view of the configuration of a principal part of a fourth concrete example of the content distribution system shown in FIG. 7.

Next, a fourth example of concrete application of the content distribution system 1100 will be explained by referring to FIG. 12 and FIG. 13.

The fourth concrete example is configured similar to the third concrete example, but the copying is controlled by the content owner 1200 not by superimposing an electronic watermark on the content data, but by adding a control descriptor to the content data in the same way as the broadcaster 1300.

Namely, the content owner 1200 adds copy control information for controlling the usage of the content which becomes valid in the set top box 1500 to the content data in the form of a control descriptor (control descriptor 1) by a control descriptor adder 1212. Then, the content data with the control descriptor added thereto is encrypted at the encryptor 1210 by using the encryption key Ka and the encrypted content data is transferred to the broadcaster 1300.

The broadcaster 1300 adds a unique control descriptor (control descriptor 2) to the encrypted content data transferred from the content owner 1200 at the control descriptor adder 1306, encrypts this at the encryptor 1302 by using the encryption key Kb, and transfers the same.

The set top box 1500 receiving this decrypts the encryption for the conditional access performed by the broadcaster 1300 at the decryptor 1502 by using the encryption key Kb. A control descriptor 2 detector 1512 detects the control descriptor 2 added by the broadcaster 1300 from this decrypted signal and outputs the result to the decision controller 1514.

The signal decrypted at the decryptor 1502 is further decrypted at the decryptor 1504 by using the encryption key Ka. Then, a control descriptor 1 detector 1516 detects the control descriptor 1 added by the content owner 1200 from this decrypted signal and outputs it to the decision controller 1514.

The decision controller 1514 performs the decision for controlling the usage of the received content data based on the control descriptor 1 set by the content owner 1200 input from the control descriptor 1 detector 1516 and the control descriptor 2 set by the broadcaster 1300 input from the control descriptor 2 detector 1512 and controls the output data based on that decision.

Here, it is assumed that the control descriptor 1 and the control descriptor 2 set to output the content data from each set top box 1500 by either transfer by 5C encryption or by transfer without encryption. In that case, the decision controller 1514 performs a decision according to the flowchart as shown in for example FIG. 13.

Namely, when the decision is started (step S20), first, the control descriptor 1 input from the control descriptor 1 detector 1516 is referred to so as to judge whether it sets 5C encryption (step S21). When it sets 5C encryption, a control signal for selecting the output of the 5C encryptor 1508 is output to the output switch 1510, whereby 5C encrypted content data is output from the set top box 1500 (step S22).

When the control descriptor 1 input from the control descriptor 1 detector 1516 does not set 5C encryption (step S21), the control descriptor 2 input from the control descriptor 2 detector 1512 is referred to so as to judge whether or not it sets 5C encryption (step S23). Then, when it sets 5C encryption, in the same way as the case where the control descriptor 1 sets this, a control signal for selecting the output of the 5C encryptor 1508 is output to the output switch 1510, whereby 5C encrypted content data is output from the set top box 1500 (step S22).

When the control descriptor 2 input from the control descriptor 2 detector 1512 also does not set 5C encryption (step S23), the decision controller 1514 outputs a control signal for selecting the output from the decryptor 1504 to the output switch 1510, whereby unencrypted content data is output from the set top box 1500 (step S24).

In this way, in the fourth concrete example, the content owner 1200 and the broadcaster 1300 can independently set control of the usage of the content data in the form of adding a control descriptor. Further, they can freely set how to give priority to what setting and how to control the same by changing an algorithm set in the decision controller 1514.

Figure 13:
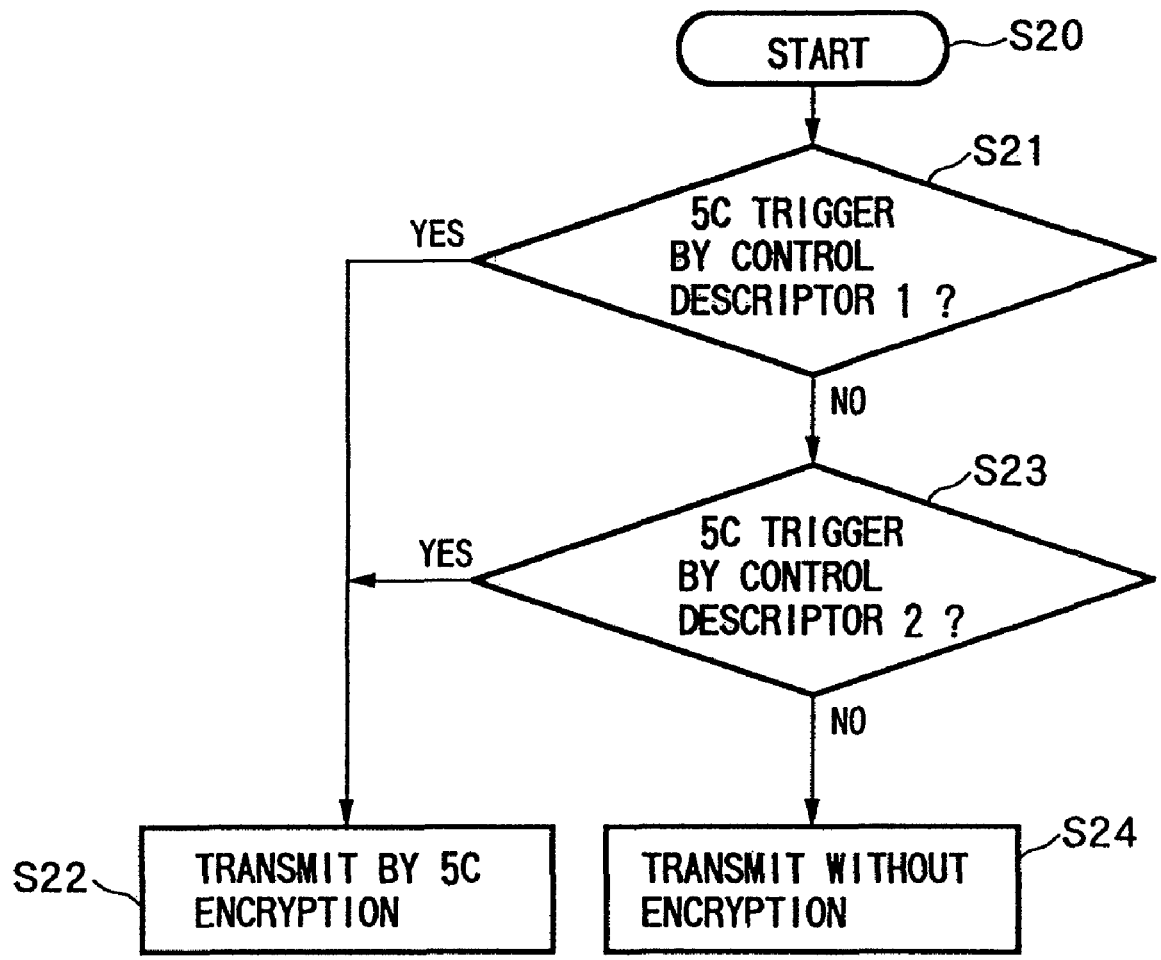
FIG. 13 is a flowchart for explaining the decision processing in the decision controller of the set top box shown in FIG. 12.

Further, by employing the algorithm as shown in for example FIG. 13, it is possible to execute the setting of the content owner 1200 with priority over the setting of the broadcaster 1300.

Fifth Concrete Example

A fifth example of concrete application of the content distribution system 1100 will be explained next by referring to FIG. 14.

The fifth concrete example enables suitable control of copying even with respect to analog output from the set top box 1500.

In this case, first, the content owner 1200 superimposes the copy control information desired to be set on the content data in the form of an electronic watermark by the electronic watermark superimposer 1208. This electronic watermark information is used for the copy protection of the analog output from the set top box 1500.

Further, the content owner 1200 encrypts the content data with the electronic watermark information superimposed thereon at the encryptor 1210 by using the encryption key Ka. The content owner 1200 transfers both this encrypted content data and the previous copy control information to the broadcaster 1300.

The broadcaster 1300 converts the copy control information transferred from the content owner 1200 to the control descriptor, then adds this to the encrypted content data transferred from the content owner 1200 at the control descriptor adder 1306, encrypts the same at the encryptor 1302 by using the encryption key Kb, and transfers the same.

The set top box 1500 receiving this decrypts the encryption for the conditional access performed by the broadcaster 1300 at the decryptor 1502 by using the encryption key Kb. The control descriptor detector 1512 detects the control descriptor added by the broadcaster 1300 from this decrypted signal upon instruction from the content owner 1200 and generates a control signal for controlling the output switch 1510 and applies it to the output switch 1510.

Further, the signal decrypted at the decryptor 1502 is further decrypted at the decryptor 1504 by using the encryption key Ka. This decrypted signal is 5C encrypted at the 5C encryptor 1508 or directly applied to the output switch 1510. Either is selected at the output switch 1510 and output as the digital output.

On the other hand, the signal decrypted at the decryptor 1502 is input to an analog signal encoder 1518, converted to an analog signal here, and output from the set top box 1500.

In this way, in the fifth concrete example, particularly, it is possible to output from the set top box 1500 an adequately right processed analog signal with the copyright protection information superimposed thereon by the electronic watermark. Accordingly, this is preferred where an analog signal output is required.

Figure 14:
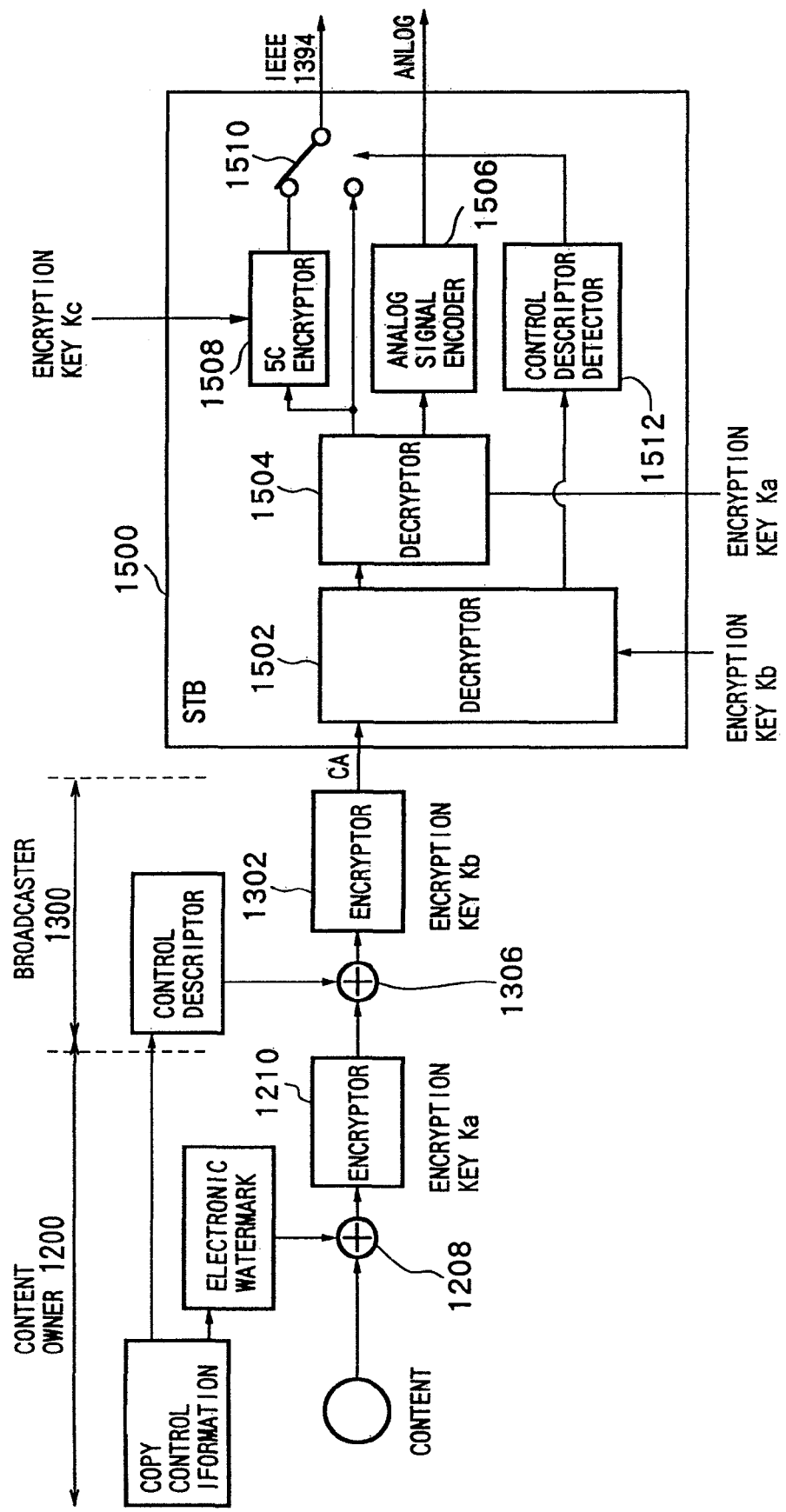
FIG. 14 is a view of the configuration of a principal part of a fifth concrete example of the content distribution system shown in FIG. 7.
Figure 15:
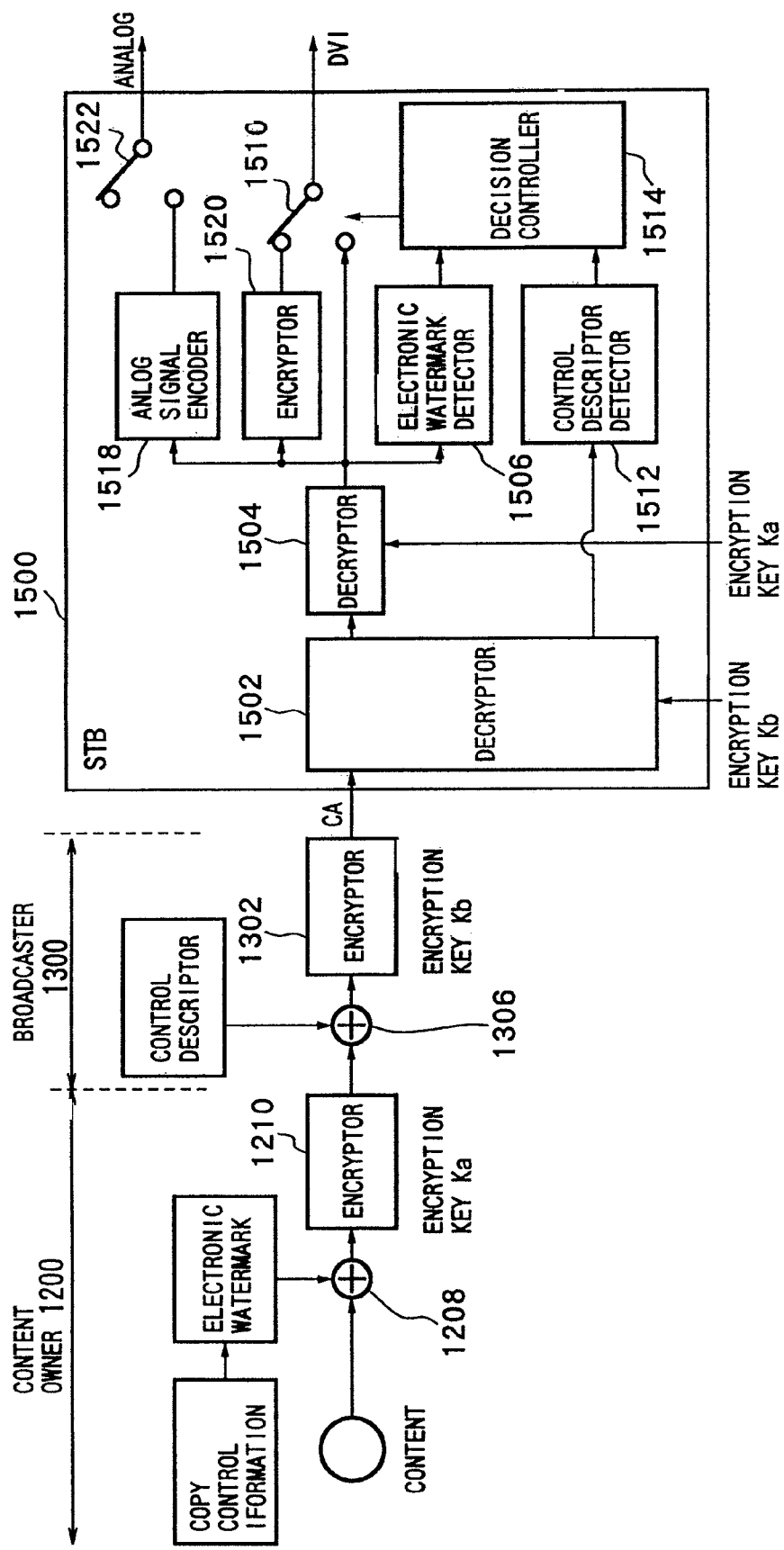
FIG. 15 is a view of the configuration of a principal part of a sixth concrete example of the content distribution system shown in FIG. 7.

Note that, in the configuration shown in FIG. 14, the copy control information requested by the content owner 1200 is converted to a control descriptor by the broadcaster 1300 and added to the content data. If the broadcaster 1300 is a sufficiently reliable institution, there is no problem in employing such a configuration. However, when the content owner 1200 sets control itself for a certain reason, in the same way as the case of the third concrete example, the control descriptor may also be set by the content owner 1200.

Sixth Concrete Example

An explanation will be made of a sixth example of concrete application of the content distribution system 1100 by referring to FIG. 15.

In the sixth concrete example, the digital output from the set top box 1500 is made either of monitor connection use DVI (digital visual interface) and copyright protected output (DVI-CP) and enable the analog output to be turned ON/OFF.

In this case, the content owner 1200 superimposes the copy control information desired to be set on the content data in the form of an electronic watermark at the electronic watermark superimposing unit 1208, encrypts the content data with that electronic watermark information superimposed thereon at the encryptor 1210 by using the encryption key Ka, and transfers the encrypted content data to the broadcaster 1300.

The broadcaster 1300 adds the unique control descriptor to the encrypted content data transferred from the content owner 1200 at the control descriptor adder 1306, then performs the encryption for the conditional access at the encryptor 1302 by using the encryption key Kb and transfers the same.

The set top box 1500 receiving this decrypts the encryption for the conditional access performed by the broadcaster 1300 at the decryptor 1502 by using the encryption key Kb, detects the control descriptor added by the broadcaster 1300 from this decrypted signal at the control descriptor detector 1512, and outputs the same to the decision controller 1514.

Also, the signal decrypted at the decryptor 1502 is further decrypted at the decryptor 1504 by using the encryption key Ka, and the copy control information superimposed in the form of the electronic watermark by the content owner 1200 is detected from this decrypted signal at the electronic watermark detector 1506 and output to the decision controller 1514.

The decision controller 1514 performs the decision for controlling the usage of the received content data based on the copy control information set by the content owner 1200 input from the electronic watermark detector 1506 and the control descriptor set by the broadcaster 1300 input from the control descriptor detector 1512 and controls the output data based on the decision.

Concretely, the decision controller 1514 performs a decision as to whether to output the baseband data or output data encrypted by the DVI-CP as the digital output from the set top box 1500, makes a decision as to whether or not to output an analog signal, and outputs control signals based on the results of the decision to the output switch 1510 and an analog output switch 1522.

Further, the signal decrypted at the decryptor 1504 is encrypted to DVI-CP at an encryptor 1520 or directly applied to the output switch 1510. Either is selected at the output switch 1510 and output as the digital output.

On the other hand, the signal decrypted at the decryptor 1504 is input to the analog signal encoder 1518, converted to an analog signal here, applied to the analog output switch 1522, selected at the analog output switch 1522 under the control of the decision controller 1514, and output as the analog output.

In this way, in the sixth concrete example, a digital video signal can be output from the set top box 1500 by DVI as the RGB baseband signal or an encoded signal. Also, a suitably right processed analog signal with the copyright protection information superimposed thereon by the electronic watermark can be selectively output.

Modification

Note that the present invention is not limited to the above embodiments. Various preferred modifications are possible.

For example, the apparatus connected to the set top box 1500 and used in the content distribution system 1100 was a display device for displaying a video signal, but the invention is not limited to this. Any image processing device can be connected too. For example, it is also possible to connect a recording device for recording the output data or connect a transfer device for transferring the output data.

Further, the output I/F of the set top box 1500 is not limited to the IEEE1394 and DVI shown in the above embodiments. Any I/F can be used.

Further, the means for transmitting the data between the broadcaster 1300 and the set top box 1500 is not limited to a broadcasting means. Any information transmitting means can be applied.

Further, not limited to a so-called broadcast, a transferring means for transmitting the desired content data to a requesting set top box 1500 in response to a request from the set top box 1500 can be used too.

Further, in the present embodiment, the content to be distributed was a video signal and a video signal containing an audio signal, but it is not limited to this. It can be applied to the distribution of any content data. For example, it can be used as a distribution system of audio data, still image data, game software programs, any program software, etc.

As explained above, in the present invention illustrated in the first and second embodiments, information indicating a receiver not having a function enabling copying of content indicated by the content signal is held by utilizing the transferred content signal. When information indicating the connected receiver is included in this held information, the non-copyright protected content signal is transmitted. For this reason, a signal compatible with the receiver can be transmitted in accordance with whether or not the receiver has a function enabling copying of the content.

Further, when it is decided that the content is copyright protected, a copyright protected content signal is transferred. When it is decided that information indicating the connected receiver is included in the held information, a non-copyright protected content signal is transferred regardless of whether the content is copyright protected. For this reason, so far as the receiver does not have a function for enabling copying, even copyright protected content can be used.

Further, a change in connection of the connected receiver is monitored for while transferring a content signal of copyright protected content data without providing copyright protection. When a change in connection is detected, transmission of a non-copyright protected content signal is prohibited. For this reason, even if a receiver having a function for enabling copying is switched to while content signal is being transmitted without providing copyright protection, the content can be copyright protected.

Further, since the information indicating the receiver is held in a tamper-proof updateable manner, copyright protection can be correctly provided to the content. Further, even if a new receiver not having a function enabling copying is connected, it can be easily handled by updating the information.

Further, it is possible to provide a data distribution system and a data distribution method enabling a content owner to directly control copying as desired while using a standard apparatus as a processor after the receiver.

Further, it is possible to provide a data receiver used in such a content distribution system, receiving the distributed content data, performing adequate right processing, and outputting the content data in a usable manner.

Further, it is possible to provide a data provider and a data providing method for providing content data to be distributed in a state where the owner of the content can control the usage thereof.

Further, it is possible to provide a data transferer for transferring the data provided in this way.

INDUSTRIAL APPLICABILITY

The present invention can be applied to a music distribution system for distributing for example musical works via a network, hardware used for that music distribution system, and data processing methods in that music distribution system.

The invention claimed is:

1. A transmitter for selectively transmitting a non-copy protected content signal or a copyright protected processed content signal to a connected receiver, comprising:
   transmission processing means for selectively processing a content signal for copyright protection, thereby producing a copyright protected processed content signal;
   transmission controlling means for receiving information indicating if a receiver connected to said transmitter is enabled to copy content and for controlling signal transmission by the transmitter in accordance with said received information such that a non-copy protected content signal is transmitted if said connected receiver is not enabled to copy content; and
   means for monitoring for a change in connection of the receiver connected to said transmitter while said non-copy protected content signal is being transmitted, to control said transmitter to prohibit transmission of the non-copy protected content signal and to change over to transmit a copyright protected processed content signal when a change in the connected receiver is detected.

2. A transmitter as set forth in claim 1,
   wherein said transmitter includes protection detecting means for determining if said content is copyright protected; and
   wherein said transmission controlling means controls the transmitter to transmit a copyright protected content signal when said protection detecting means determines that said content is copyright protected and to transmit a non-copyright protected content signal regardless of the determination by said protection detecting means when said received information indicates that the connected receiver is not enabled to copy content.

3. A transmitter as set forth in claim 1,
   wherein said transmission controlling means controls said transmitter to transmit the copyright protected processed content signal instead of the non-copy protected content signal so that said non-copy protected content signal is not transmitted.

4. A method for selectively transmitting a non-copy protected content signal or a copyright protected processed content signal from a transmitter to a receiver connected to the transmitter, comprising:
   selectively processing a content signal for copyright protection, thereby producing a copyright protected processed content signal;
   receiving information indicating if the receiver connected to said transmitter is enabled to copy content and for controlling signal transmission by the transmitter in accordance with said received information such that a non-copy protected content signal is transmitted if said connected receiver is not enabled to copy content; and
   monitoring for a change in connection of the receiver connected to said transmitter while said non-copy protected content signal is being transmitted, to control said transmitter to prohibit transmission of the non-copy protected content signal and to change over to transmit a copyright protected processed content signal when a change in the connected receiver is detected.

5. A method as set forth in claim 4, including the steps of determining if said content is copyright protected; and
   controlling the transmitter to transmit a copyright protected content signal when said content is determined to be copyright protected and to transmit a non-copyright protected content signal regardless of the determination when the received information indicates that the connected receiver is not enabled to copy content.

6. A method as set forth in claim 4, wherein said transmitter is controlled to transmit the copyright protected processed content signal instead of the non-copy protected content signal so that said non-copy protected content signal is not transmitted.

7. A receiver for selectively receiving a non-copy protected content signal or a copyright protected processed content signal from a connected transmitter, depending upon the processing ability of said receiver, comprising:
   means for sending to said transmitter information indicating if said receiver is enabled to copy content; and
   means for receiving from said transmitter a non-copy protected content signal if said receiver is not enabled to copy content and for receiving from said transmitter a copyright protected processed content signal if said receiver is able to copy content;
   wherein if the connection of said receiver to said transmitter is changed while said non-copy protected content signal is being transmitted, reception of said non-copy protected content signal by said receiver terminates.

8. A receiver as set forth in claim 7, wherein a copyright protected content signal is received when said content is determined to be copyright protected and a non-copyright protected content signal is received even if said content is determined to be copyright protected when the sent information indicates that the receiver is not enabled to copy content.

9. A receiver as set forth in claim 7, wherein the copyright protected processed content signal is received instead of the non-copy protected content signal so that said non-copy protected content signal is not received.

10. A method for selectively receiving at a receiver a non-copy protected content signal or a copyright protected processed content signal from a connected transmitter, depending upon the processing ability of said receiver, comprising:
    sending to said transmitter information indicating if said receiver is enabled to copy content; and receiving from said transmitter a non-copy protected content signal if said receiver is not enabled to copy content and receiving from said transmitter a copyright protected processed content signal if said receiver is able to copy content;

wherein if the connection of said receiver to said transmitter is changed while said non-copy protected content signal is being transmitted, reception of said non-copy protected content signal by said receiver terminates.

11. A method as set forth in claim 10, wherein a copyright protected content signal is received when said content is determined to be copyright protected and a non-copyright protected content signal is received even if said content is determined to be copyright protected when the sent information indicates that the receiver is not enabled to copy content.

12. A method as set forth in claim 10, wherein the copyright protected processed content signal is received instead of the non-copy protected content signal so that said non-copy protected content signal is not received.

* * * * *